(12) United States Patent
Latta

(10) Patent No.: US 6,556,927 B1
(45) Date of Patent: Apr. 29, 2003

(54) PICOSTRAIN ENGINEERING DATA ACQUISITION SYSTEM

(75) Inventor: Bernard Mitchel Latta, Boise, ID (US)

(73) Assignee: Idaho Transportation Department, Boise, ID (US)

(*) Notice: Subject to any disclaimer, the term of this patent is extended or adjusted under 35 U.S.C. 154(b) by 0 days.

(21) Appl. No.: 09/140,819

(22) Filed: Aug. 26, 1998

(51) Int. Cl.⁷ .............................................. G01L 1/12

(52) U.S. Cl. .................... 702/41; 702/43; 702/175; 177/210 EM

(58) Field of Search ............................ 702/41–44, 57, 702/89, 92–98, 101, 102, 104, 105, 113–116, 33–36, 38, 121–126, 138–142, 145–148, 156, 143, 150–153, 173–176, 178, 183–185, 189, 190, 197, FOR 103, FOR 104, FOR 130, FOR 123–FOR 126, FOR 170–FOR 172, FOR 143, FOR 144, FOR 149–FOR 154, FOR 164; 340/936, 941, 933, 939, 665, 666, 934, 935, 938, 669, 670; 404/9–11, 13; 701/117–119, 124; 367/97, 91; 177/210 FP, 210 EM, 45, 136, 137, 25.14, 210 R, 132, 133, 211, 210 C, 1, 135, 185, 163; 324/655, 207.21, 207.23, 236, 207.11, 13–15, 244, 209, 256, 251, 242, 243, 245; 73/146, 1.13, 1.15, 488, 493–495, 510, 511, 862.046, 1.37, 573–582, 862.336; 331/65; 200/86 A, 85 R, 86 R

(56) References Cited

U.S. PATENT DOCUMENTS 4,192,394 A  3/1980 Simpson ...................... 177/45
4,430,636 A  2/1984 Bruce ........................ 340/941

(List continued on next page.)

FOREIGN PATENT DOCUMENTS

GB    2 228 606 A  *  8/1990

OTHER PUBLICATIONS

3M Product Bulletin EC–30003, January 1983 Entitled Canoga Brand Vehicle Detection Systems, 4 pages.
Weight Appendix from the Mechanican Universe, Introduction to Mechanics and Heat by Richard Olenick, Tom M Apostol & David L. Goodstein, Cambridge University Press, 198A5, ISBN 0–521–30429–6, 1985. (No month), p. 117.
Electronics 1 Appendix from 3M Corporation by George E. Palm, 3 pages. (No date).
Motion 1 Appendix from Conceptual Physics. . . a new introduction to your environment, Fourth Edition by Paul G. Hewitt, Little, Brown and Company, 1981, ISBN 0–316–35969–6, 6 pages, (No month).
Motion 2 Appendix from Conceptual Physics. . . a new introduction to your environment, Fourth Edition by Paul G. Hewitt, Little, Brown and Company, 1981, ISBN 0–316–35969–6, 2 pages(No month).
Work/Energy 3 Appendix from University Physics, Third Edition Complete by F.W. Sears M. and W. Zemansky, Addison–Wesley, 1964, Library of Congress Catalog Card No. 63–15265, 3 pages.

*Primary Examiner*—Hal Wachsman
(74) *Attorney, Agent, or Firm*—Robert L. Shaver; Frank J. Dykas; Stephen M. Nipper

(57) ABSTRACT

A sensing device for detecting and identifying vehicles or other events which apply force to a roadway or other structure. The force applied by a vehicle is interpreted to produce a force signature which is unique to a vehicle, and thus can be used to identify individual vehicles. Other force events which can detected and identified include pedestrians, motorcycles, avalanches, roadway deterioration, structural failure of bridges or other structures, avalanches, bicycles, and railroad trains.

35 Claims, 11 Drawing Sheets

U.S. PATENT DOCUMENTS

| | | | |
|---|---|---|---|
| 4,539,650 A | 9/1985 | Griffin et al. | 364/567 |
| 4,789,941 A | 12/1988 | Nunberg | 364/436 |
| 5,002,141 A | 3/1991 | Loshbough et al. | 177/210 FP |
| 5,008,666 A | 4/1991 | Gebert et al. | 340/936 |
| 5,016,200 A | 5/1991 | Passarelli | 364/567 |
| 5,052,232 A * | 10/1991 | Garshelis | 73/862.336 |
| 5,260,520 A * | 11/1993 | Muhs et al. | 177/210 R |
| 5,278,555 A * | 1/1994 | Hoekman | 340/936 |
| 5,360,953 A * | 11/1994 | Reed | 340/666 |
| 5,450,077 A * | 9/1995 | Tyburski | 340/933 |
| 5,477,217 A * | 12/1995 | Bergan | 340/666 |
| 5,621,195 A * | 4/1997 | Taylor et al. | 177/133 |

* cited by examiner

PICOSTRAIN ENGINEERING DATA ACQUISITION SYSTEM

BACKGROUND OF THE INVENTION

1. Field of the Invention

The present invention generally relates to devices and methods for highway and traffic engineering data acquisition, including vehicle weighing, vehicle classification, structural analysis, and roadway structural condition monitoring.

2. Background Information

There has long been a need to use electronic sensing in relation to vehicle travel, and obtaining other highway and traffic data for engineering purposes. Current proprietary engineering data acquisition systems for use at permanent roadway sites have been shown to be expensive to install, of limited durability, and for the most part are not interchangeable between the various manufacturers. Current systems require that a large slot be cut into the pavement, and in many cases, that the transducer system be epoxied flush with the surface of the roadway structure. This requires a large expenditure of resources for a relatively short-lived system.

Due to roadway rutting and point impact loading from studded vehicle tires, the durability of these engineering data acquisition systems has been shown to be on the order of two to three years before failure. Many are inherently open loop gain systems, and are subject to an immediate change in calibration. Each axle event has been shown to make a slight change in the characteristics of their transducers. This drift has been demonstrated to be cumulative.

Devices have been patented for obtaining a weight for vehicles while they are in motion. Devices also exist for detecting the presence of a vehicle, in order to activate a traffic signal. Devices also exist for determining the velocity of a vehicle traveling over a certain stretch of road. What these systems lack is the ability to identify a vehicle by the pattern of force which is transmitted by the mass of the vehicle into the roadway structure as the vehicle travels. These prior art systems also lack the ability to analyze the force distribution a vehicle presents to the roadway structure in order to evaluate the loading of each axle of the vehicle, the velocity of a vehicle, and the acceleration and deceleration of a vehicle. These prior art systems also lack the ability to monitor a section of roadway to evaluate the structural condition of the roadway itself. The prior art devices also lack the ability to monitor force distribution from objects and events other than vehicles, such as the force patterns made over road surfaces by avalanches, mud slides, rock falls and even the passage of bicycles, pedestrians and animals. The prior art devices also lack the ability to utilize force distribution from objects and events to track objects and events from one location to another.

Accordingly, it is an object of the invention to provide an apparatus and method for determining the mass, velocity, presence, the acceleration and deceleration, and the tracking of a vehicle over a roadway.

Another object of the invention is to provide an apparatus and method of identifying a vehicle by the force pattern distribution it creates as it passes over a roadway.

A further object of the invention is to provide an apparatus and method for monitoring the physical integrity and condition of a section of roadway structure.

Another object is to provide an apparatus and method for evaluating the distribution of the mass on the axles of a vehicle in motion.

A further object of the invention is to provide an apparatus and a method for detecting the passage of bicycles, pedestrians and animals across a road surface.

A further object of the invention is to provide an apparatus and a method for detecting the presence and severity of such highway maintenance problems as avalanches, mud slides, and rock slides.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These and other objects are accomplished by a detection system for generating engineering data which senses internal structural picostrains produced by a force event. The picostrains act on an array of one or more transducers, to generate a signal representative of the force event or a signal with information about the force event. The picostrains of interest to the invention include those generated by a vehicle traveling on a roadway or a structure, or another event which generates a force event on a roadway or structure. These picostrains could be sensed by an array of one or more transducers, which generate a signal representative of the force signature of the vehicle or force generator. In one mode of the preferred embodiment of the invention, the applied force from the vehicle creates a three dimensional zone or spheroid of isobaric pressure gradients under each wheel of a vehicle. As a vehicle travels along a road, the wheels of the vehicle apply pressure to the roadway directly below the vehicle. Other objects can create a force event, such as avalanches, rock slides, mud slides, seismic events, pedestrians, animals, bicycles, or motorcycles. The invention can operate in conjunction with a broad array of transducer types, including strain gauges, fiber optic, piezoelectric strip, and cable, accelerometer, capaticitive strip, or any one of many other technologies which may be made to respond to isobaric pressure gradients and horizontal shear.

One version of the invention includes an array of one or more transducers laid horizontally across a roadbed, which sends a filtered and amplified signal to a computer which generates a unique signature for that vehicle, which was the source of the force event. This system can be described in terms of an orthogonal axis system, in which the roadway is the X axis, and the Y axis is horizontal and is perpendicular to the X axis. The Z axis is vertical, and perpendicular to the plane which contains the X and Y axis. The transducer array is laid in slots in the roadway structure, along the Y axis of the roadway. The slots with the transducer array installed are filled with a material such as epoxy which has a modulus of elasticity which makes the slot with the transducer installed behave as an integral part of the roadway structure.

The force which is applied to the roadway structure by a passing vehicle travels along the X axis, and passes over and through the region of the transducer array. The applied force is referenced to a particular time, or $T_o$. The applied force is a pressure wave created by an object such as a vehicle traveling on a road. This pressure forms what could be called a virtual spheroid of deformation beneath the applied force. This could be illustrated as a ball with a side compressed from a pressure applied to one side, with the side opposite showing an equivalent compression due to the reactive forces generated within the structural material. The deformation of this virtual spheroid is proportional to:

$$F_n \text{ approximately} = ks$$

where $F_n$ represents the force applied normal to the surface of the spheroid, and where k represents the volumetric force constant of the deformed material, and where s represents the reactive volumetric displacement about the surface of the spheroid. The zone of increased pressure below the wheels of the vehicle is in an isobaric gradient, in an anisotropic structural material, with the highest pressure area closest to the tire, and lower pressure areas radiating out from the tire.

Along with a zone of isobaric pressure with its pressure gradients, the tire of the vehicle can cause a slight physical displacement of the pavement itself. This physical displacement within the pavement structure resembles a wave which proceeds in front of the wheel, and there is also a wave which follows behind the wheel. As the raised wave in the pavement and the pressure gradient under the vehicle tire pass over the transducer, the two adjacent sides of the transducer rotate differentially in relation to each other. This physical rotation of the two opposite sides of the transducer in relation to each other causes the transducer to pass through the lines of magnetic force which emanate from one portion of the earth's surface and travel towards another portion of the earth's surface in an arc. As the transducer differentially cuts across these planetary lines of magnetic force, an electrical signal is generated. The electrical signal is referenced to time and passed through an amplifier. A filter follows the amplifier and discriminates against unwanted signal components of the signal generated by the transducers. The amplified and filtered signals are sent to a computer where they are analyzed and stored. A mathematical means within the computer is used to develop a "proportional kinetic energy envelope", or force signature, for the applied dynamic force which generated the signal. This force signature may be represented in a graph which shows pressure, displacement, and time of the signals.

The applied force generated by vehicles is different for each vehicle, and is unique for each vehicle. It is determined by the mass of the vehicle, the distribution of the mass on the wheels, the rolling resistance and other physical characteristics of the tires, the type of suspension of the vehicle, and the adjustment of the suspension.

Due to these differences in mass, tire characteristics, suspension, and tuning of suspension, each vehicle develops a unique pattern of applied force within the pavement structure as it travels. This unique pattern of applied force is what is responsible for the force signature. The transducers of the picostrain detector are displaced by the applied force of the moving vehicle, and send a signal to the computer which interprets the signal to produce a unique signature for each vehicle which passes over the picostrain detector.

Another version of the invention utilizes a transducer which generates a signal due to a change in dimension of the transducer. This can occur if the transducer is configured as a loop around and tightly coupled to a physical structure which expands as a result of a dynamic force applied to it through the center of the transducer loop. The transducer of this version of the invention would be looped around and tightly coupled to a concrete structure, and when a vehicle or other dynamic force generating event passed over the structure, it would expand, as previously explained. This would cause the transducer to also expand, and this change in dimension would generate a signal.

The picostrain detector can in addition detect dynamically applied forces from a number of other force generating events, such as seismic events, motorcycles, bicycles, pedestrians, wheel chairs, railroad equipment, animals, avalanches, mud slides, and rock slides.

These individually unique force signatures for each vehicle can be used in tracking and monitoring vehicles on roadways. A vehicle, such as a semi-tractor trailer rig with a load of goods, can pass over a picostrain detector at the beginning of a trip. At that time, the force signature and an industrial standard identifier for that vehicle and that load is entered into a computer system. As that particular truck passes from state to state and from weigh station to weigh station, it need not stop to be weighed or to have the unique mass distribution applied to each axle checked. Merely by driving over subsequent picostrain detectors, it generates its own force signature, which is compared to the original one on file for that truck with that load. If mass has been added to the truck, such as by adding contraband, or if mass has been removed from the truck, such as by the removal of goods being hauled, the next weigh station would detect this. Similarly, if the trailer was switched to another tractor, or if the axles of the trailer were moved for a different special distribution or configuration and corresponding change in mass over each axle, the next picostrain detector would detect it. At that time, the truck could be pulled over for an inspection. If there were no unusual changes in the force signature for that truck and for said load, it could proceed without stopping to a destination across the country. By comparison, the current practice is for such a vehicle to stop at weigh stations which occur at every border between states, and on a number of highways within the state. At each of these weigh stations, the truck driver has each axle of his truck weighed, and fills out paperwork identifying himself, the truck, and the goods that are on the truck.

In another vehicle tracking application, a gated community or secure facility could utilize picostrain detectors, either alone or in conjunction with detectors of other types, such as but not limited to: human, or video; for gaining admission to the area. All of the vehicles which are authorized to enter the area would pass over a picostrain detector in order to identify the vehicle and to record the force signature for the vehicle. Subsequently, a vehicle which is not authorized to be in that area would be detected, and appropriate steps could be taken to admit or deny access to the vehicle. For instance, in a gated community, a gate could automatically open for all correctly identified vehicles. Vehicles whose force signatures were not pre-approved would have to identify themselves and their reason for entering before being allowed admission. Passing over the picostrain detector would also create a record similar to a sign-in log for every vehicle which passed over it.

Similarly, an automatic processing system for vehicles, passing through a weigh station, a secure, or other facility with multiple decision points in the vehicle processing route, could be implemented.

In another version of the invention, the picostrain detector depends upon the roadway or other structure acting as an isotropic medium, and thus the picostrain detector could evaluate pavement structure for deterioration by noting how well it transmits a known force. When cracks and fissures develop in the pavement, rather than a force being transmitted smoothly through the pavement under the rolling wheels, the force is dissipated into the separate and isolated blocks created by the cracks and fissures in the pavement. Thus, if a known vehicle, type of vehicle, or force signature was identified at a picostrain detector, but its signal became indistinct or diminished over time, the computer could ascertain that the pavement in that region was not transmitting force as an isotropic substance, and that this section of pavement had experienced structural degradation.

Besides evaluating a section of roadway for structural integrity, the picostrain detector could be used to evaluate the structural integrity of other structures, such as concrete bridges, and steel girders.

It could be used in a railroad crossing signal detection system.

In a similar manner, the picostrain detector can be used to detect forces besides vehicles on pavement. For instance, a picostrain detector installed along a section of roadway which is subject to avalanches, would be used to report the presence of an avalanche, the severity and the extent of it. Rock slides and mud slides would be similarly detected and reported. A section of roadway which was particularly prone to avalanching could also have a series of picostrain detectors installed along the section of roadway which would monitor the passages of vehicles. If a particular vehicle was to be detected entering the high avalanche zone, and was not detected exiting the high avalanche zone, and an avalanche occurred at that time, rescuers would know that a vehicle of given classification was possibly trapped in the avalanche, and highway and rescue personnel would know that a vehicle was possibly buried in the avalanche zone as they were using snow removal equipment to clear the highway.

The picostrain detector can include a sensing unit for sensing an applied dynamic force before it reaches the device, determining the range of that applied force, signaling the device for calibration to the proper range, and for resetting the device for repeat operation after that applied force has passed.

Still other objects and advantages of the present invention will become readily apparent to those skilled in this art from the following detailed description wherein I have shown and described only the preferred embodiments of the invention, simply by way of illustration of the best mode contemplated by carrying out my invention. As will be realized, the invention is capable of modification in various obvious respects all without departing from the invention. Accordingly, the drawings and description are to be regarded as illustrative in nature, and not as restrictive.

DESCRIPTION OF THE PREFERRED EMBODIMENTS

Figure 1:
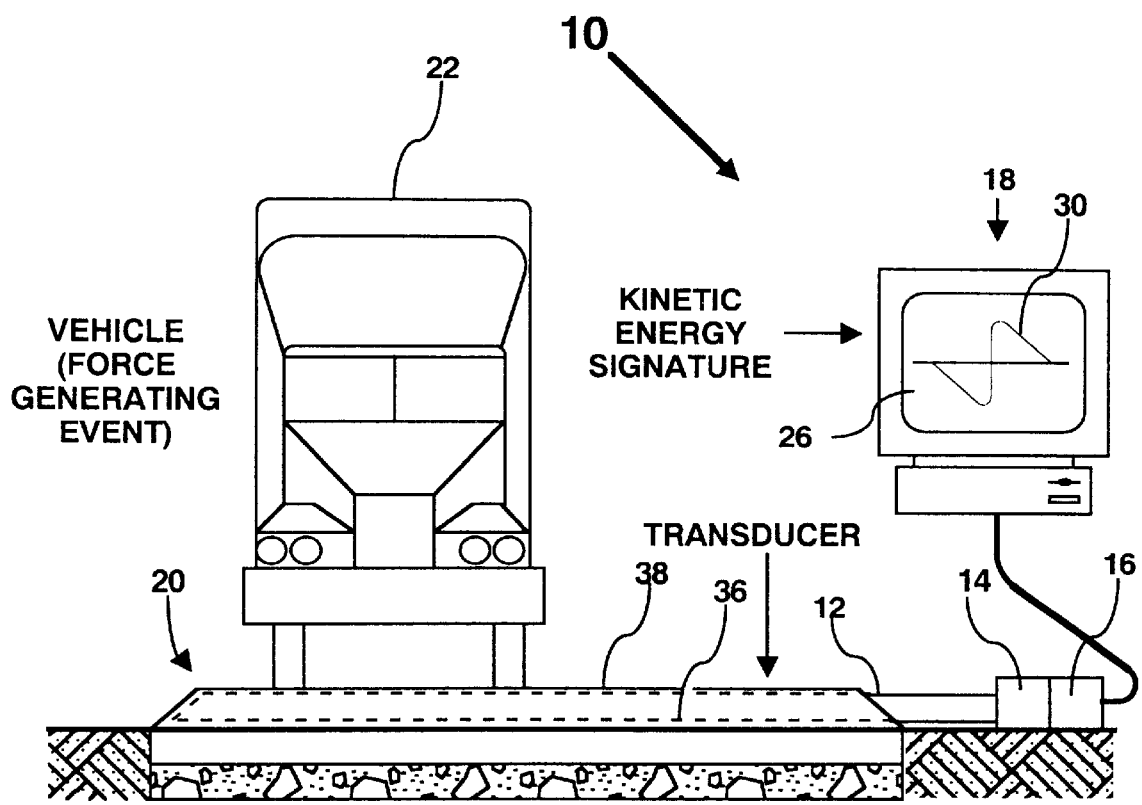
FIG. 1 is a front view of a picostrain engineering data acquisition system installed on a roadway for sensing the passage of a vehicle.

The preferred embodiments of the invention are shown in FIGS. 1 through 11. The invention is a detection system for generating engineering data, and the first preferred embodiment is more specifically called a picostrain detection data acquisition system or picostrain detector 10, which senses structural picostrains produced by a force event. The structural picostrains act on an array of one or more transducers 12, to generate a signal 30 representative of the force event 28. One embodiment of the picostrain detector 10 is shown in FIG. 1 as an installation within a roadway pavement structure 20, and the force event in this case is a vehicle 22. The structural picostrains generated by the vehicle 22 act on the transducer 12 to generate a signal 30 which is passed through a signal amplifier 14, a signal filter 16, and is then sent to the computer 18 where it can be electronically stored and displayed. The signal 30 is shown on an on-site computer 18, and transmitted to a central computer (not shown).

Figure 2:
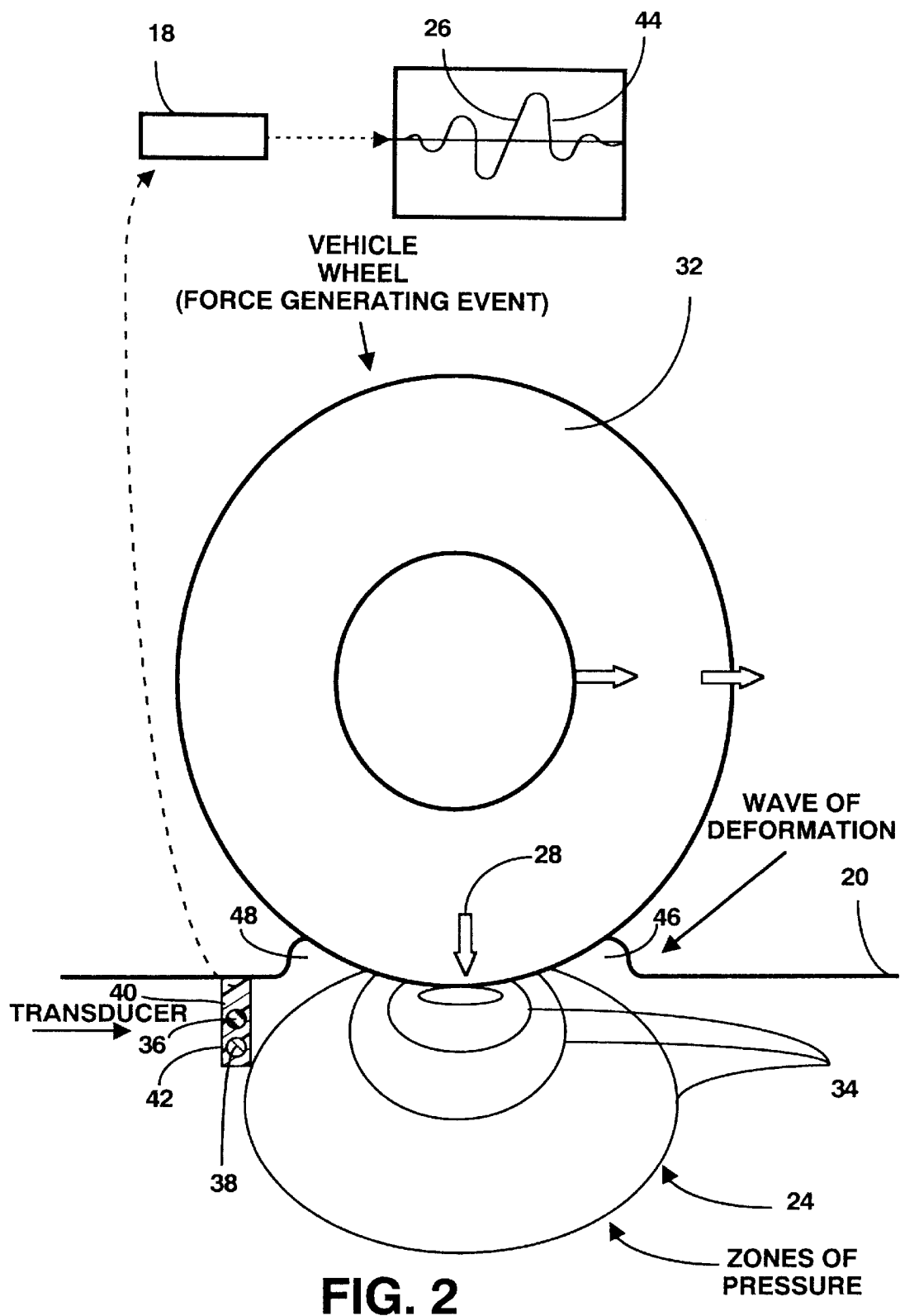
FIG. 2 is a diagrammatic depiction of the mechanism of operation of the picostrain engineering data acquisition system.

Referring to FIG. 2, and using a vehicle 22 as an example of a force event 28, and the transducer being imbedded in an anisoptropic matrix, such as that making up the base course of the roadway structure, the applied force from the vehicle is a zone of increased pressure under each vehicle tire 32. As a vehicle 22 travels along a road, the wheels and tires 32 of the vehicle 22 apply pressure to the roadway 20 directly below the vehicle. This pressure forms what could be called a virtual spheroid of deformation 24 beneath the applied force. This virtual spheroid 24 would be shaped generally like a ball with a side compressed from a pressure applied to one side, as shown in FIG. 2. The virtual spheroid 24 would contain a pressure gradient, as illustrated by the isobaric lines 34, from highest pressure next to the pressure source, or vehicle tire 32, to lower pressure radiating away from the source. Accompanying the pressure gradients within the spheroid is a leading wave 46 and a trailing 48, which are physical displacements of the material of the roadway, i.e. horizontal shear. The picostrain detector senses the isobaric pressure gradient and the horizontal shear, and produces a corresponding signal.

To better understand the nature of the system, the structural picostrains being detected, and the principle behind the system, certain basic concepts should be presented. The following constraints are assumed to simplify the explanation of the physics of the system, though these constraints do not limit the actual operation of the invention. These constraints are:

1) that the roadway is in all ways straight and level, and;
2) that the X axis is parallel to the direction of travel along the roadway, and;
3) that the Y axis is at right angles along the roadway, transverse to the direction of travel, and;
4) that the Z axis is normal to the plane developed by the X and Y axis, and;
5) that the Z axis passes through the center of mass of the earth, and;
6) that the X axis may be at any azimuth about the Z axis.

A force, such as the force exerted by a vehicle traveling along the roadway, is applied to the roadway structure along the Z axis, normal to the face of the roadway. Travel along the X axis, is from left to right along the roadway.

The force generates energy, which does work. The ultimate goal is to determine the amount of work performed upon, and thus, the total amount of kinetic energy that will be developed resultant from the force event, in a transducer imbedded within the roadway structure along the Y axis, and subjected to a force traveling across it along the X axis. To do so, the dynamic force applied along the Z axis must be transformed into work developed along the X axis.

From standard physics definitions, weight may be defined as;

$$W_{eight} = mg \cos \theta$$

where $W_{eight}$ represents weight,
and where m represents mass,
and where g, represents the acceleration applied to the mass along the Z axis, toward the center of the earth, due to the gravitational pull of the earth upon that mass.
and where $\cos \theta$, in this particular case, is equal to one, where the gravitational acceleration is normal to the mass.

It can be shown from physics that $W_{eight}$, as defined above, may be redefined as follows:

$$W_{eight} = mg = ma = F_v$$

with g being represented as an acceleration a, along the Z axis.

From standard physics definitions, work may be defined as:

$$W_{ork} = F_v(s_1 - s_0) \cos \theta$$

where $F_v$ represents force applied along the Z axis,
and where $(s_1 - s_0)$ represents total displacement along the Z axis.

That is, work is equivalent to the displacement a mass is subjected to under a force applied normal to that displacement. In this particular case the displacement is along the X axis and the force vector is being applied along the Z axis.

By definition, no work can be performed upon the transducer placed along the Y axis, by moving a force applied along the Z axis, across it along the X axis; this by reason of the cosine of angle $\theta$ between the Z and the X axis being 90 degrees, and thus, equal to zero.

It can be shown from mechanics that, at any point in a member subjected to shearing forces, there exists equal shearing stresses in planes mutually at right angles to each other. By use of these shear stresses generated within the pavement structure, the vertical forces applied to the pavement structure may virtually be converted into horizontal forces that are now applied normal to the direction of travel and transducer displacement, and thus, work may now be performed upon the transducer.

It can be shown from physics that work and energy are scalar quantities, the total sum of the work performed upon a transducer, from any source or direction, is algebraically cumulative. Therefore, the total work performed by all individual forces and their associated displacements upon a transducer, and hence the final change in the kinetic energy of that transducer, is equal to the combined energy of each force event.

It can be shown from physics, that any work performed upon a body by gravity that displaces that body along a vertical path with respect to the center of the earth, will be zero, if said body is at the same relative elevation before and after the event. Other major sources of work due to vertical forces that must be accounted for within the process, are those due to the dynamic, and the steady state components of the force as it travels across the transducer.

In the useful operational modes of the preferred embodiment of the transducer, the transducer will be either inherently uni-axial in sensitivity, or the axis of minimum sensitivity will be oriented normal with the directly applied vertical forces, and thus, these forces need not be further considered in the process.

In the context of an applied or dynamic force, also called a force event 28, which is generated by a moving vehicle 22 passing over a roadway structure 20, energy transferred to a transducer within the roadway structure can be understood in several different ways, depending on the type of roadway structural material which is involved and the mechanism of energy transfer. Each of these is an expression of Hooke's law, which states that the strain developed within a solid is directly proportional to the stress applied to it, within the elastic limits of the material. Each of these materials or mechanisms is best detected and reported by a different operational mode of the transducer, each of which operate within the bounds of the invention, and which will be described below.

One possible type of roadway structural material is a type of material which shows different properties of compressibility in different directions. This type of material is termed an anisotropic material. This could be likened to a ball which is compressed and responds to that compression by non-uniformly bulging in certain areas, along the various axis. In an isotropic material, the Bulk Modulus is used to understand and predict the transmission of pressure through the material. Bulk Modulus may be defined as: Volume Stress/ Volume Strain=constant which may be mathematically defined as:

$$B = -(F_n/A)/(\Delta V/V_0) = -(p)/(\Delta V/V_0)$$

where B=Bulk Modulus,
and where p=hydrostatic pressure,
and where $\Delta V$=change in volume of section to which $F_n$ has been applied, due to the application of $F_n$,
and where $V_0$=natural volume of section to which $F_n$ will be applied.

Figure 3:
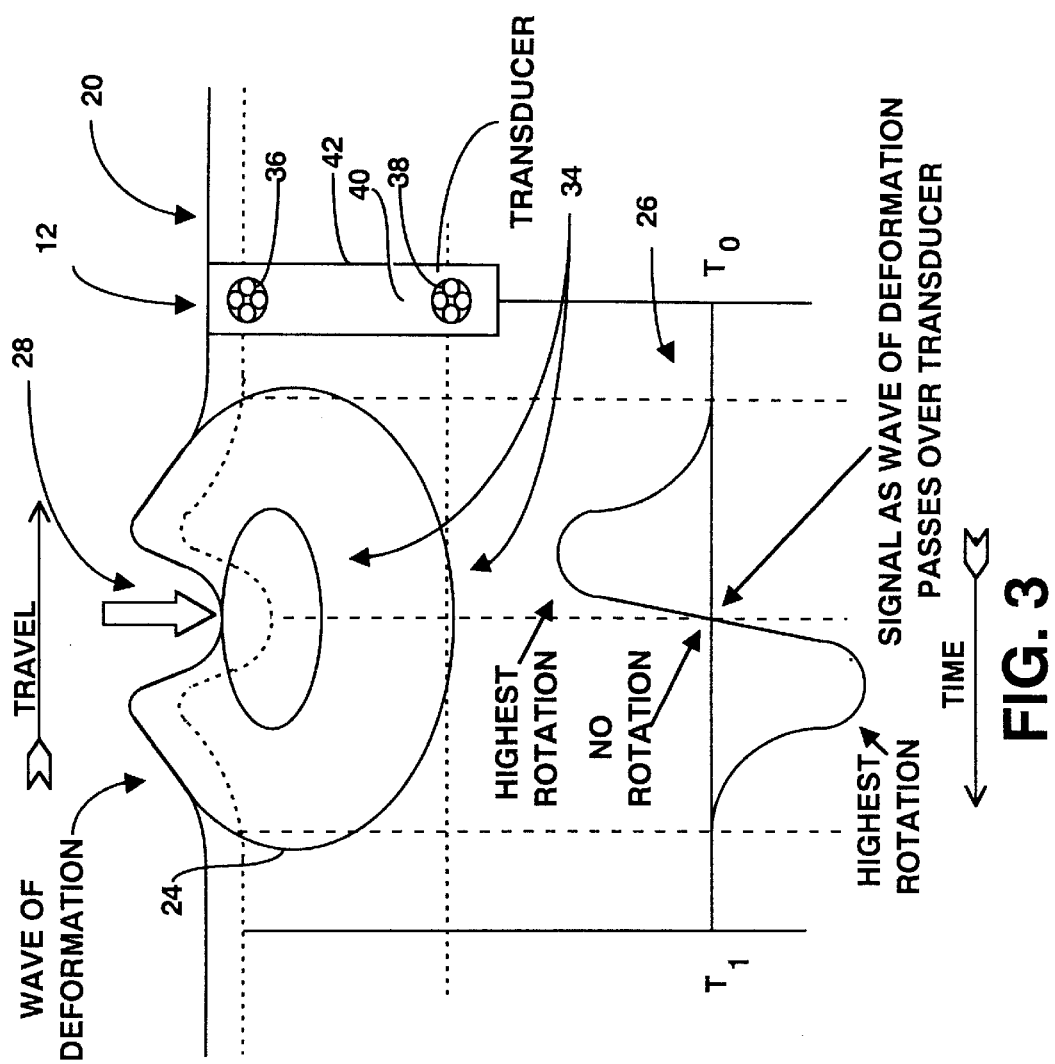
FIG. 3 is a diagrammatic view of one preferred embodiment of the picostrain engineering data acquisition system and the force signal it generates.

Solving for the force, this equation may be expressed as:

$$F_n = ks$$

where $k = (BA)/V_0$,
and where $s = \Delta V$,

This is a particular expression of Hooke's Law, and thus, displacement resulting within the material may now be represented by s. The significance of this is that when energy is transmitted through an anisotropic material a wave of isobaric pressure gradients 34 in a virtual spheroid 24 passes over the transducer 12, as shown in FIG. 2, and in more detail in FIG. 3. If a transducer is of a type which senses from two or more positions, each transducer position is instantaneously exposed to a different isobaric pressure gradient 34. In this operational mode of the preferred embodiment, the transducer 12 is a linear cable which extends across the roadway structure in a first section 36, makes a 180 turn, and in a second section 38 contiguous with the first section 36 returns back across the roadway structure 20 adjacent to the first section 34, as shown in FIGS. 1, 2 and 3. With this kind of transducer 12, each section of the transducer 12 would experience the same isobaric pressure gradients within the structure 34 at different times, and at any one time each leg of the transducer would be at a different isobaric pressure gradient within the structure 34. Due to this, each section would experience different instantaneous physical displacement in relation to the other section of transducer 12. This physical displacement caused by exposure to different isobaric pressures of the gradient within the structure 34 would generate an electrical signal 30, and the signal would describe the force event 28. In other words, a virtual spheroid of displacement 24 within an anisotropic material, comprising a pressure gradient 34, if applied at some constant velocity along the X axis, passing at right angles across a transducer imbedded within the structure laying parallel to the Y axis, would produce a power curve 26 proportional to the velocity, and more importantly, to the instantaneous value of the rate of change of the isobaric pressure gradient across the virtual spheroid developed within the structure 24. This power curve 26 would convey data about the force event 28, including a force signature 44 for the force event 28, which would be unique for a force event 28 or a particular vehicle 22. This mechanism for generating a signal 30 and a power curve 26 is shown in detail in FIG. 3. FIG. 3 shows a transducer 12 which comprises a first section 36 and a second section 38, contained in a slot 42, that may be filled with an epoxy like compound 40. The power curve 26 represents and is directly proportional to the instantaneous value of the differential rate of change of the contact of the isobaric pressure gradients 34 of the virtual spheroid 24 within the structure 20 with the two adjacent legs of the transducer 12. The right hand edge of the power curve 26 is generated by the first contact of the isobaric pressure gradients within the structure 34 with the transducer 12. The left hand curve of the power curve 26 is generated by the last contact of the pressure gradients within the structure 34 with the transducer 12, as indicated by the TIME legend.

Force events in anisotropic material are best detected using transducers of Class B, which are detailed later. The transducer 12 generates a signal 30 from another mechanism in a structure (roadway) comprised of isotropic material. This second manner in which energy from a passing force event (vehicle) is transmitted through the material of a roadway structure occurs through the energy transmission mechanism of a rigid and isotropic layer of a roadway structure 20. The energy of a passing vehicle transmitted through rigid and isotropic material is understood by the shear modulus of the material of the roadway structure. Shear Modulus may be defined as Shear Stress/Shear Strain=constant which may be mathematically defined as:

$$S=(F_t/A)/\phi$$

where S=shear Modulus,
and where $F_t$=torsional force, applied normal to and at the edge of the unit area, opposite that where $\phi$ is developed,
and where A=cross sectional unit area at right angles to applied force,
and where $\phi$=the angle, expressed in radians, by which the molecular layers of a section subjected to shear forces are offset.

Solving for the force, this equation may be expressed as:

$$F_n=ks$$

where k=(SA),
and where s=$\phi$,
which is a particular expression of Hooke's Law, and thus, angular displacement resulting within the material may now be represented by s.

The virtual spheroid of displacement within the structure 24 which was discussed above is transmitted through a roadway of rigid and isotropic material accompanied by a physical displacement. This displacement is a leading wave 46 and a trailing wave 48, and is shown in detail in FIG. 4. The transducer 12 in the roadway 20 moves through this wave just like a buoy rides through a wave in the ocean. It moves vertically and, more importantly, rotates parallel with the surface of the roadway, in both the leading wave 46 and the trailing wave 48. As it so rotates, the two sections of the transducer 12 move up and down together identically, and more importantly, rotate in relation to each other, creating an electrical signal 30. Another way of expressing this is to say that the virtual spheroid of displacement within the structure 24, as it travels along a roadway 20 at some constant velocity along the X axis, and passes at right angles across a transducer 12 imbedded within the structure 20 laying parallel to the Y axis, generates a power curve 26 proportional to the velocity, and more importantly, to the instantaneous value of the rate of rotation of the transducer 12 as it is subjected to the instantaneous value of the rate of angular displacement, $\phi$, of the structural shear. This second mechanism (mode) of energy transfer causes rotation of one section of the transducer 12 to another, and generates an electrical signal 30. As in an anisotropic material, Type B transducers would best detect this kind of energy transmission, and a passive loop of conductive material is the preferred Type B transducer.

Figure 4:
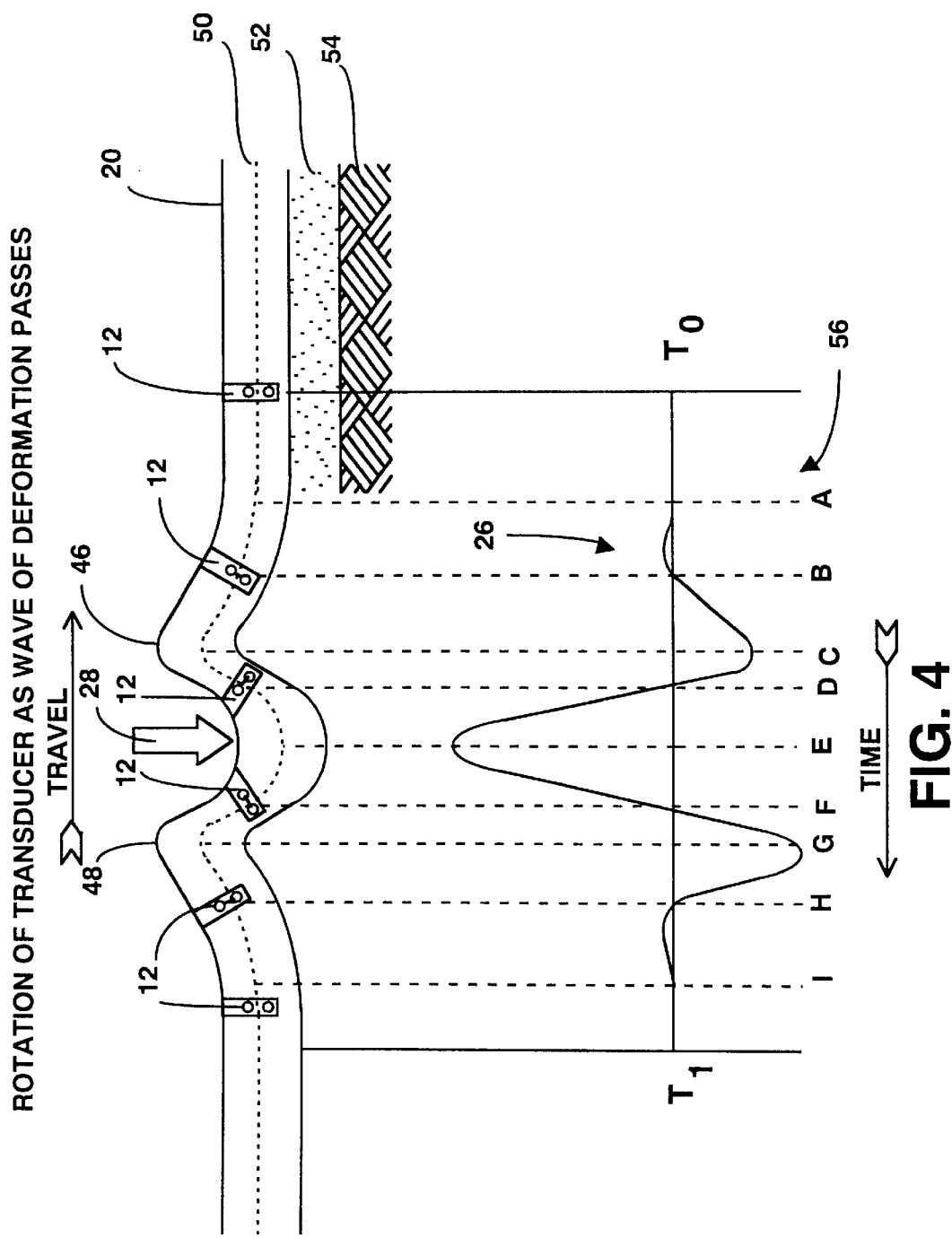
FIG. 4 is a diagrammatic view of a second preferred embodiment of the picostrain engineering data acquisition system, and the force signal it generates.

FIG. 4 shows a power curve 26 which corresponds to the displacement by rotation of transducer 12. The structure or roadway 20 includes as an example; a pavement layer 50, a base course 52, and a subgrade 54. At points of inflection 56 the instantaneous rate of rotation of the transducer 12 produces the corresponding portion of the power curve 26. Thus when the instantaneous rate of rotation of the transducer approaches zero at points A, B, D, F, H and I, the power curve is at zero. At points C, E and G, the instantaneous rate of rotation is at a maximum; however, the slope of the signal change polarity as the instantaneous rate of rotation moves toward the zero points. At positions when the rate of rotation of the transducer 12 is not equal to zero, a signal, either positive or negative, is generated and shown in the power curve 26.

Figure 5:
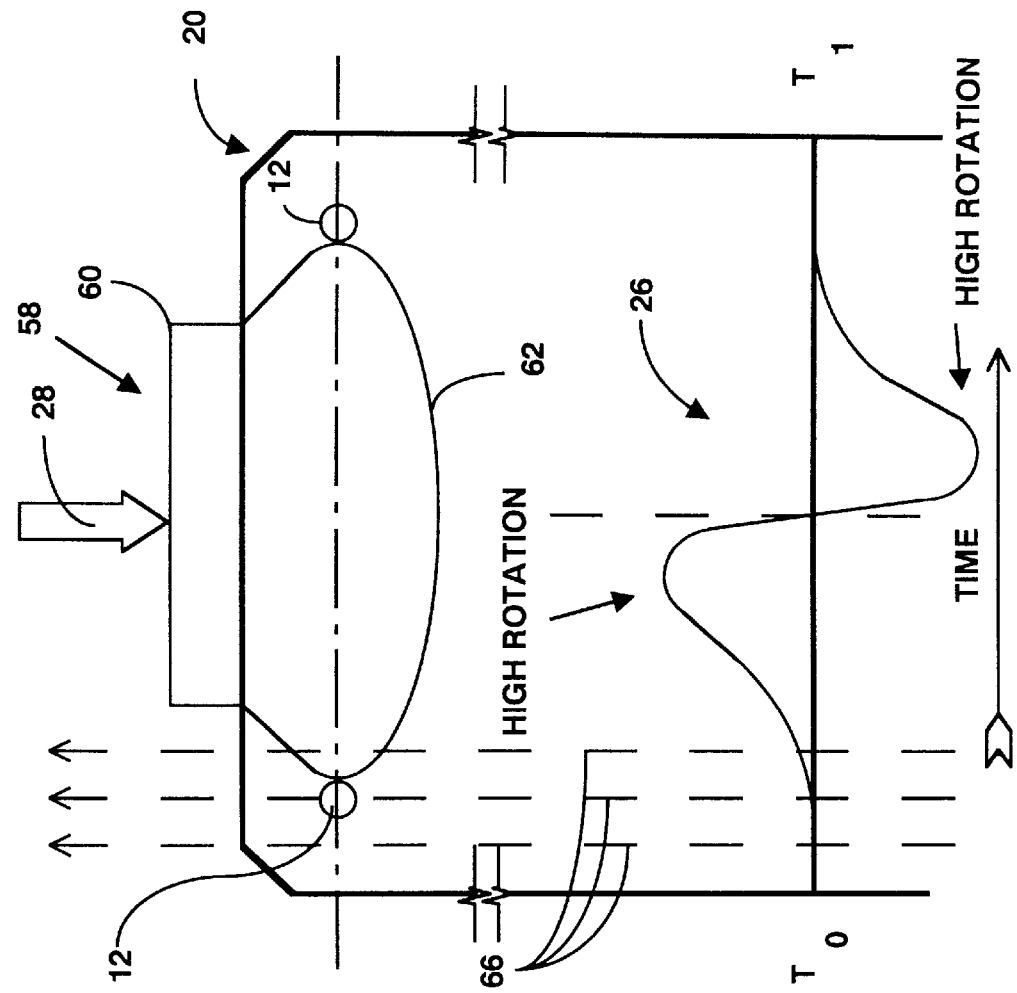
FIG. 5 is a diagrammatic view of a third preferred embodiment of the picostrain engineering data acquisition system, and the force signal generated by a force event.

A third manner (mode) in which energy from a passing force event or vehicle is transmitted through the material of a roadway structure, either anisotropic or isotropic material, occurs when the roadway structural material is pressed down along one axis and is expanded along another by the pressure of the force event. This manner of energy transmission requires the use of another operational mode of the transducer to best detect it, and results in a second preferred embodiment of the invention, which is shown in FIG. 5. The physics of this manner of energy transmission, is understood by the bulk modulus, Poisson's Ration, and Young's Modulus.

Young's Modulus may be defined as Stress/Strain= constant which may be mathematically defined as:

$$Y=(F_n/A)/(\Delta l/l_0)$$

where Y=Young's Modulus,
and where $F_n$=force applied normal to unit area,
and where A=cross sectional unit area normal to applied force,
and where $\Delta l$=change in length of section to which $F_n$ has been applied, due to the application of $F_n$,
and where $l_0$=natural length of section to which $F_n$ will be applied.

Poisson's Ratio may be defined as the ratio of the contraction in diameter to the extension in length as a specimen is placed in tension which may be mathematically defined as:

$$S=(\Delta d/d_0)/(\Delta l/l_0)$$

where S=Poisson's Ratio,
and where $F_n$=force applied normal to unit area,
and where A=cross sectional unit area normal to applied force,
and where $\Delta d$=change in diameter of section to which $F_n$ has been applied, due to the application of $F_n$,
and where $d_0$=natural diameter of section to which $F_n$ will be applied.
and where $\Delta l$=change in length of section to which $F_n$ has been applied, due to the application of $F_n$,
and where $l_0$=natural length of section to which $F_n$ will be applied.

Solving for the force, this equation may be expressed as:

$$F_n=ks$$

where $k=3AB/l_0$,
and where $s=(1-2\ S)\Delta l$,
which is a particular expression of Hooke's Law, and thus, displacement resulting within the material may now be represented by s.

This third mechanism of energy transfer would occur under a force event 28, and would be detected by a transducer of Type A, which is explained below.

This type of energy transfer is shown in FIG. 5. As shown in FIG. 5, a transducer 12 is looped in a subsurface region of a structure 20 (pier cap or compression block) below a bearing plate 58. The bearing plate 58 is an adjunct structure which extends above the main structure slightly, and serves to uniformly distribute applied point forces over a larger area of the main structural material. The bearing plate 58 can be of various shapes, such as circular or square. It can be made of a variety of material which uniformly transmit force, but most generally is of steel. It can be made up of an assembly of any generally used structural shape(s) hollow or solid, as long as it transmits force, and the characteristics of transmission are well known. The bearing plate 58 is tightly coupled to the main structural member 20. When a force event 28 is applied to the bearing plate 58, the energy of the force event 28 is transferred into the material of the roadway or structure 20 below the bearing plate 58. In isotropic or near isotropic material the transmitted force results in the deformation of a spheroid of structural material 62. This spheroid of deformation 62 causes displacement and a differential change in dimension of the transducer 12 along the X-Y plane, and generates a signal 30. The power curve 26 reflects the signal 30 generated as a result of the instantaneous rate of change of the dimension of transducer 12. This type of energy transmission and transducer can be utilized to sense characteristics of passing vehicles. It can be mounted in pier caps, compression blocks, railroad ties, near the top of a wall where dynamic loading of the wall is to be monitored, or in a footing where dynamic loadings on the footing are to be measured.

The significance of this third mechanism (mode) of energy transfer is that if a virtual spheroid of displacement 62 developed within a structure 20 by a dynamic force moving at some constant velocity along the X axis, and passes at right angles across a coupling that projects the force throughout the center of the loop making up the transducer 12 laying parallel to the Y axis, a power curve 26 proportional to the velocity, and more importantly, to the instantaneous value of the rates of change of the length and of the diameter of the transducer 12 would be generated. The transducer 12 which would best sense changes in length and diameter from pressure would be a Type A transducer, which is described below.

In the domain of physics entitled the theory of elasticity, or its engineering counterpart, strength of materials, there are three general cases for the more particular classes of transducers that may be utilized within the Picostrain system.

Each of these three mechanisms (modes) of energy transmission are mathematically related as shown below:

$$B=Y/3(1-2\ \sigma)$$

$$S=Y/2(1+\sigma)$$

$$\sigma(sigma)=(Y/2S)-1$$

through which are developed the three general classes of transducers, which are:

Class A transducers are those that are sensitive to changes in Dimension;

Class B transducers are those that are sensitive to changes in Rotation; and,

Class C transducers are those that are sensitive to changes in Displacement.

Displacements and Transition Zones in the Virtual Spheroid

In the preferred embodiments there will be horizontal and vertical components to the normal forces at the face of the virtual spheroid that this concept depends upon for operation, as illustrated in FIG. 3. Displacements resulting from these forces may be accounted for by mathematical methods, and/or by choosing transducers with a predominant axis and/or mode of sensitivity.

It is also true that, in most cases, the virtual spheroid that this concept depends upon for operation will be smaller in diameter along the X and the Y axis than the total length of the transducer detection zone, and signal transition zones may be present. These may be accounted for mathematically.

Should the virtual spheroid that this concept depends upon for operation be utilized in an anisotropic material, such as a pavement matrix or base-course aggregate, signal transition zones will normally be present. These may be accounted for mathematically.

For all mechanisms (modes) of energy transmission, if the impact of the individual signal components generated by these undesirable forces on the picostrain detector is small enough to be deemed insignificant, through engineering judgment and/or through analysis, they may be ignored.

Diaphragms and Sections

In all mechanisms (modes) of energy transmission utilizing transducers that are directionally sensitive on more than one axis, the directional characteristics may be modified so as to appear virtually uni-axial by appropriate attachment to a suitably designed diaphragm, or other section deemed appropriate for the application. By prudent application of this technique, undesirable tangential forces in the process may be minimized, or transformed.

Such diaphragms or other sections are not necessary for use with the preferred embodiment of the picostrain transducer, due to it's inherently uni-axial nature.

The mechanisms of transmission of energy which have been describe above in relation to the first and second operational modes of the preferred transducer embodiment transmit power to the transducer, where the work energy is converted to electromotive energy, according to the following formulas. Power may be defined as the time rate of performing work, and may be expressed as:

$$P=F_n(\Delta s/\Delta t)$$

where P represents the instantaneous power,
and where ($\Delta s/\Delta t$) represents instantaneous velocity vector,
and where s represents the displacement,
and where t represents the time,
and where $F_n$ represents the instantaneous force vector,
or in scalar terms;

$$P=F_n \cdot v \cos \theta$$

where v represents the instantaneous velocity vector,
and where $\cos \theta$ is equal to one, where the force is applied normal to the displacement.

Given this, the following particular association may be developed. As the virtual spheroid, discussed in the general cases above, moves across the transducer; the resultant power curve may be expressed as:

$$F_h \cdot v = ks \cdot v = P$$

where ks represents the instantaneous magnitude of the horizontal component of the normal force vector and associated displacement within the roadway structure,
and where v represents the instantaneous velocity vector of the virtual deformation spheroid within the structure along the X axis, and thus, works in conjunction with ks,
and where P represents the instantaneous power of the event.

Combining multiple instantaneous time domain samples of the mechanical power being applied to the transducer 12 across the total mechanical energy event will give a good representation of the total kinetic energy content of that event.

Measuring the corresponding resultant instantaneous voltages across the output of a linear detection circuit will provide an equivalent or proportional representation of the instantaneous power developed within the transducer 12, in response to the applied mechanical power, at the same instant in time. Connecting the dots, by appropriate mathematical methods along each of the instantaneous voltage values measured in the time domain, will provide a power curve representative of the kinetic energy envelope of the entire event; for either the mechanical or the electrical domains.

It can be shown from physics that work energy or kinetic energy may be expressed as:

$$E_k(mv^2)/2$$

where $E_k$ represents kinetic energy,
and where m represents mass,
and where v represents velocity
whereby the kinetic energy of a moving body can be shown to be equal to the work it can do in being brought to rest.

If one were to multiply both sides of F=ma by s, we get Fs=mas, since $s=(at^2)/2$, we may write $Fs=ma((at^2)/2)=(m(at)^2)/2$; and substituting v=at, we get $Fs=(mv^2)/2$, where work is on the left and the equivalent kinetic energy is on the right:
where F represents instantaneous force vector,
and where m represents mass,
and where s represents instantaneous displacement,
and where a represents instantaneous acceleration,
and where t represents instantaneous time,
and where v represents instantaneous velocity vector.

With this transform, the equality between work and kinetic energy, $F_h$ being applied normal to the displacement of the mass, has been shown. This leads logically to the next expression:

$$m=(2F_h s)/v^2$$

where $F_h$ represents instantaneous horizontal force,

This expression clearly illustrates that if the variables s and v are known, the basis for equating the dynamic energy content of a force crossing a transducer, to that force's mass, has been shown.

The power of the force event 28 performs work on the transducer 12 by imparting movement of rotation of the leg opposite of the transducer loop with respect to each other or by changing the dimension of the transducer 12. This in turn creates electromotive force. In the preferred embodiments, the preferred mechanism to convert these forces into electromotive force is by the use of the earth's magnetosphere on a conductive loop placed within the field of said magnetosphere. The conductive loop is the transducer 12, and it is tightly coupled to the roadway structure 20 or structural member of interest, such as in a slot cut in the roadway structure and filled with an epoxy compound exhibiting a characteristic modulus of elasticity equivalent to that of the structural member of interest around the transducer, developing a signal proportional to reasonable changes in any of the independent variables as listed. The formula which describes this signal generation from a conductive loop in a magnetic field is $$e=K_\% NBA\omega \sin \alpha$$

and where e represents the instantaneous emf generated,
and where $K_\%$ represents that portion of the transducer affected by the event,
and where N represents the number of tightly coupled turns of insulated conductor making up the transducer that are exposed to the force,
and where A represents the geometric area encompassed by the transducer,
and where B represents the magnitude of the flux density passing perpendicularly through the area encompassed by the loop.
and where $\omega$ represents the instantaneous rate of rotation, in radians, of the conductive loop within the earth's magnetosphere;
and where $\sin \alpha$ is approximately equal to one.

The class of picostrain detection devices encompassed by the invention is quite independent of any particular class of transducer. Strain gage, fiber optic, piezo-electric strip and cable, accelerometer, capacitive strip, or any one of many other technologies should be deemed equally suitable for use. Each of these can be configured to measure pressure gradients and horizontal shear, and changes in dimensions, which are the mechanisms sensed and interpreted by the picostrain detector 10.

Due to both short and long term variations in such influencing factors as, but not limited to, the earth magnetic field, and seasonal climatic variations, (a) system calibration factor(s) must be developed to compensate for this and other systemic drift. Other systemic drift factors being identified as, but not limited to: such influences as degrading transducers, and structural members in failure. Access to the factor(s) would give a direct indication of the general operational health of the system. Correction factors may be developed for each transducer making up the overall system. A histogram developed from long term observation of the value of the calibration factor(s) would establish a trend line upon which to determine when a (sub)system or structural member has reached its useful operational limit, and that either repair or replacement of the (sub)system or structural member would be warranted.

The function most normally would be implemented as a mathematical constant normalized about a value of one. The mathematical interval containing this value would be bounded on the left by the value of 0.1 and on the right by the value of 10. This interval would provide a dynamic range, or bandwidth, of plus or minus one order of magnitude. Operationally, as the system calibration would tend to the right, this calibration factor would tend to the left, and vise versa. This factor may be developed as an array of force event magnitudes (axle weights) held in a circular buffer, the length of which would be some power of two. A running average of the latest values held in this array of force event magnitudes (axle weights) would be normalized about the central value of one, thus providing the value of the next calibration factor. The array would be initialized by filling the array cells with an initial value of one, or optionally after maintenance or power interruption, with the last calculated calibration factor.

The level of measurement precision required of the system will be determined by its application to a given problem. For example; the requirements for main line weigh-in-motion (WIM) at a Strategic Highway Research Project (SHRP) site will be different than the preprocessing requirement for (WIM) at a Port of Entry (POE) site. The first site may have accuracy requirements in the range of +/−20.0%, whereas, to be effective as a pre-screen for (POE) weighment, the accuracy would be more in the range of +/−1.0%.

Based on the varying requirements for measurement precision, and thus, overall system accuracy, the number of observations of an event (transducers in an array) will be variable. The overall installed cost of the system can be directly related to the size of the required transducer array meeting the accuracy needs of any given application.

To meet the required system accuracy to within the precision of a given confidence level, and thus minimize system costs, the number of observations (transducers in the array) necessary to obtain a specific standard deviation within a specified confidence level, can be determined as follows:

$$x_m = (\Sigma x_i)/n$$

where $x_m$ represents the mean measurement,
and where $x_i$=the set of measurements $(x_1, x_2, x_3, \ldots, x_n)$.

The estimate for the standard deviation may be expressed as:

$$S = (\Sigma(x_i - x_m)^2/(n-1))^{1/2}$$

Since less than-thirty observations (transducers in the array) are to be made (given a real world system), Student's t statistic will be utilized to illustrate the concept of system accuracy. Note that for higher confidence and lower standard deviation, a greater number of transducers will be needed to improve overall system accuracy.

From statistics, it can be shown that the units of measure for standard deviation are defined as being the same as those of the data being measured.

To give these intervals real world meaning; assume for purposes of comparison, an 80,000 pound, 4000 division static vehicle scale, which is typical of those utilized at (POE) sites for enforcement weighment. Each division will then be equal to 20 pounds.

The most accurate equivalent dynamic weighment that can be expected from a picostrain data acquisition system, while utilizing 10 transducers, would be +/−3.25 s×20 lb.=+/−65 pounds. Although not quite accurate enough for enforcement, where weighment must be within 0.10% of total system capacity, or +/−3.0 scale divisions, whichever is less; these weighment would, however, be good enough for pre-screening weighment at a 1.0% system accuracy level.

An additional five transducers would be required to obtain a potential equivalent system accuracy great enough to meet the three division static scale weighment requirement, as set forth in most state's legal code.

Transducer types: Available transducers are herein divided into Classes A, B, and C, for use with the first and second preferred embodiments of the picostrain detector 10. Class A Transducers are sensitive to dimensional changes. These transducers and their associated electronic systems are well known in the literature. They normally utilize such technologies as: strain gage, fiber optic, piezo electric, hydraulic, or capacitive strip technology for the active component. They are normally utilized in conjunction with a diaphragm, or other special section, to normalize forces with the active axis of the transducer, and/or discriminate against unwanted forces.

A subgroup of Class A transducers, and the preferred transducer for the second embodiment of the invention, is an electromagnetic transducer sensitive to vertical or horizontal lines of magnetic force depending upon the plane normal to the axis of the force applied. Picostrain may be detected in this particular classification by providing a differential in the A (area) independent variable, proportional to the applied mechanical force, as developed in the previous discussion of transmission of energy by change in dimension of a structural material and electromotive force. The most common embodiment, but by no means the only possible one, features the force being applied along the Z axis and applied through the center of the transducer loop that is tightly coupled to the structure; said loop laying about said axis upon (an) X-Y plane(s) at some known elevation, as illustrated in FIG. 5. Due to the inherent uni-axial nature of this particular transducer embodiment, no diaphragms or other sections are required to normalize forces.

Transducers of class A are transducers which generate an electrical signal due to a change in dimension. This type of transducer could be arranged in a concentric loop in or around a concrete block that could be generally shaped like a railroad tie. This concrete block with its wrapped transducer would be placed under a roadbed. As weight is placed on the top of the railroad tie-shaped block, the block would be structurally flattened and would expand in lateral directions. As it expands in lateral directions, the wrapped coils of the transducer differentially cut across lines of force, and generate a signal. If the same railroad tie-shaped concrete block with a wrapped or embedded class A transducer were merely moved left or right, up or down or backwards and forwards non-differentially along any axis without changing its dimensions by flattening, the loops or coils of the Class A transducer would still cut across magnetic lines of force. However, for each quantity of signal generated from one coil leg cutting along the lines of force an equal and opposite signal would be generated by the coils of the transducer side opposite cutting across other lines of force. This results in a net signal of zero. However, when the same railroad tie-shaped piece of concrete with a wrapped or embedded transducer is structurally flattened and swells laterally, the signals generated by said side opposites of the transducer coils differentially cutting across lines of force will not cancel each other out, but instead amplify each other, creating a signal relative to the amount of dimensional change of the transducer.

Another type of transducer which can be utilized with the picostrain detector 10 is a linear variable differential transducer (LVDT). This class of transducers can include accelerometers. Should an accelerometer be employed to measure horizontal forces, the unit most generally would provide a signal normalized to zero gravity; as opposed to one employed to measure vertical forces which would generally provide a signal normalized to one gravity at sea level. The general characteristics of these transducers and their associated electronic circuits as utilized for these processes are well known in the literature, and will not be developed here.

The first preferred embodiment of the picostrain detector 10 utilizes Class B transducers, which are based on sensing rotation of a transducer caused by pressure gradients and/or horizontal shear. Rotation of the transducer may be derived from the differential intersection of the two opposite transducer sides with the isometric lines of force developed within an anisotropic material, or for example, an engineering structural matrix consisting of small irregularly shaped stone, sharp sand, and a binder. Since the opposing sides of the transducer would be instantaneously subjected to a differential force magnitude, there would be developed an absolute difference in the displacement between the two legs of the transducer that can be seen as a rotation. This effect would be greatest where one side of the transducer is situated on a plane parallel to an X-Y plane near one end of the spheroid of displacement within a structural member along the Z axis, and the other being situated on a plane parallel to an X-Y plane passing through the isometric center of said spheroid, both planes being normal to the displacing force, as illustrated in FIG. 3.

Another preferred embodiment of the invention utilizes Class B transducers. A class B transducer generates a signal based on the rotation of one part of a transducer loop in relation to another part of the same transducer loop. In this type of transducer, if the transducer is moved up and down, left and right, forward and backward, non-differentially along any and all axis, the signals generated by the transducer crossing magnetic lines of force cancel each other, and there is no net signal. However, when the Class B transducer is caused to differentially rotate, one leg in relation to the leg side opposite, the magnetic lines of force which are cut do not cancel each other, but are cumulative, and produce a signal. A Class B transducer is configured so that the strand of one leg extends outward in a line, makes a 180 degree turn, and the same strand parallels itself back to its origin on the leg side opposite. A Class B transducer of this type is shown in FIG. 1. Set up on a road bed to generate a signal from the passage of a vehicle 22.

If a force applied along the Z axis were stationary, then at the macroscopic level there would be developed a proportional virtual spheroid of deformation and pressure gradient beneath that applied force, about the point of application of the force, within the material to which the force were applied. This can be illustrated much as a rubber ball being deformed by pressure from a person's hands on the ball's top side. The deformation in this instance would be proportional to $F_n$ approximately=ks where $F_n$ represents a force normal to the displacement and where k represents the force constant of the deformed material, and where s represents the displacement. This is a general expression of Hooke's Law.

The four specters along the isometric lines of force would be normal about the face of the virtual spheroid, and would be constant for any given force developing the virtual spheroid in the given roadway under consideration.

If one were to imagine this virtual spheroid of displacement within a material which shows different properties of compressibility in different directions, that is an non-isotropic material, an isobaric pressure gradient would be established across the virtual spheroid as illustrated in FIG. 2. Should the virtual spheroid 24 be applied at some constant velocity along the X axis, crossing at right angles across the transducer lane parallel to the Y axis, a power curve 26 proportional to the velocity, and more importantly, to the instantaneous value of the rate of change of the isobaric pressure gradient across the virtual spheroid would be derived, as illustrated in FIG. 2.

Figure 6:
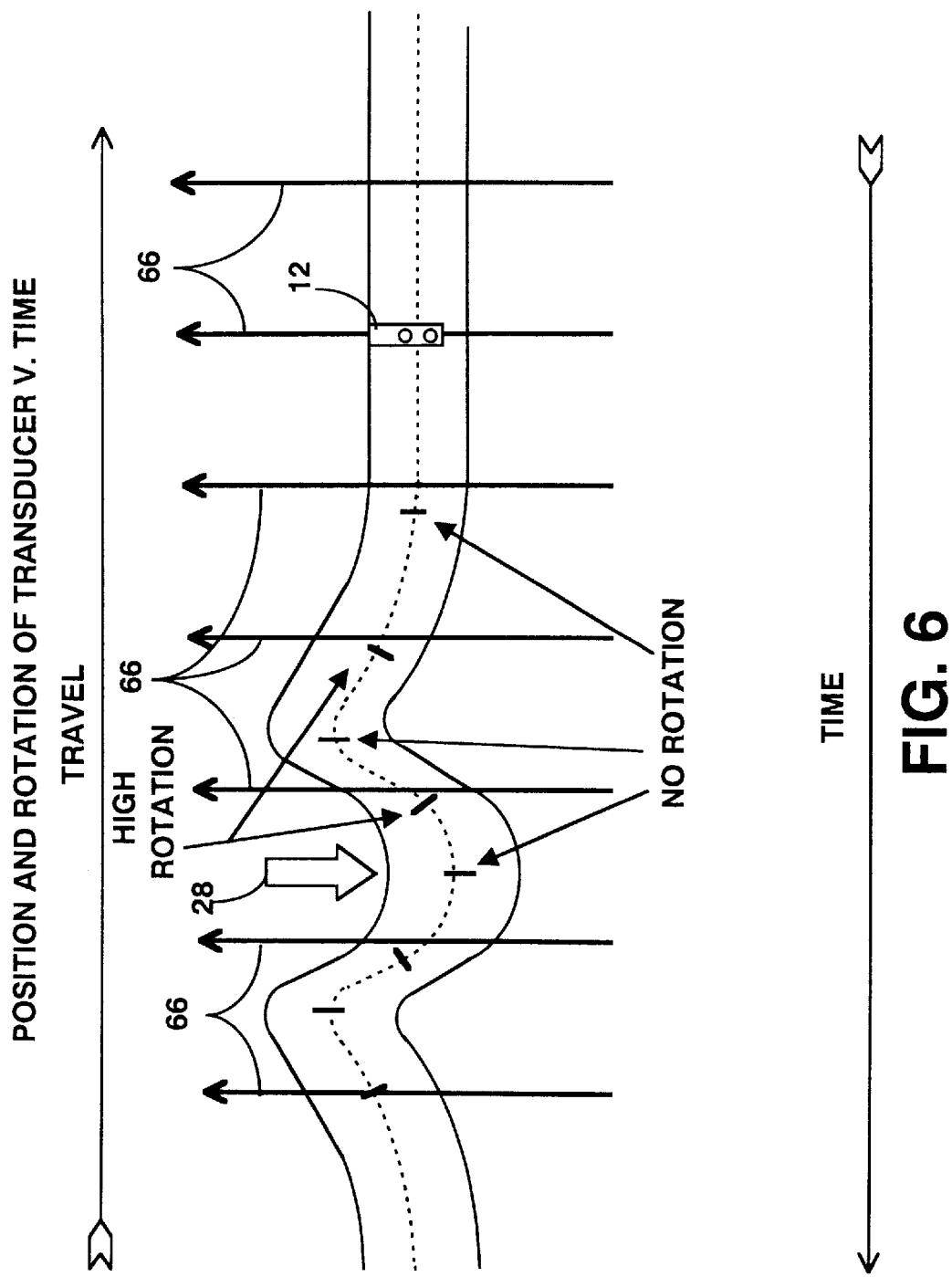
FIG. 6 is a diagrammatic view of one preferred embodiment of the picostrain engineering data acquisition system illustrating the effect of vertical magnetic components on the system.

Although the first preferred embodiment of the picostrain detector 10 is operable with any of the transducers 12 already listed, the preferred configuration of transducer 12 is one which utilizes a conductive loop as an alternating current generator, utilizing the vertical component 66 of the earth's magnetosphere as the source of the magnetic field, as shown in FIG. 6.

This particular class of transducer may be utilized at all locations where the structure permits, primarily dimensionally deep or thick sections, as illustrated in FIG. 6, except at or near the earth's magnetic equator, where the vertical field component is at a minimum, or where the axis of rotational displacement of the transducer is oriented parallel to the vertical component of the earth's magnetosphere. Since the transducer is inherently uni-axial in sensitivity, it requires no need of any diaphragm or other section to discriminate against undesirable signals generated along the axis of minimum sensitivity.

The primary mechanism of rotation is due to the instantaneous shear forces present in the structure due to the application of a force event. The signal generated by the transducer is directly proportional to the instantaneous value of the angular displacement rate of the structural shear, $\phi$; and in this particular case, the instantaneous value of that signal is represented by e, where:

$$\omega=\phi,$$

and where $\phi$ represents the instantaneous rate of angular shear displacement in radians.

Where, $$e=K_{\%}NBA\omega \sin \alpha$$

and where e represents the instantaneous emf generated,
and where $K_{\%}$ represents that portion of the transducer affected by the event,
and where N represents the number of turns of insulated wire making up the transducer that are exposed to the rotational force,
and where A represents the geometric area encompassed by the transducer,
and where B represents the magnitude of the flux density of the vertical component of the earth's magnetosphere,
and where $\omega$ represents the instantaneous rate of rotation, in radians, at right angles to the vertical (Class B1$a$) or horizontal (Class B1$b$) component of the earth's magnetosphere;
and where sin $\alpha$ is equal to one.

A typical calculation for the transducer as utilized in this particular case would provide the following results:
where N=4 turns,
and where A=1.5484×10$^{-2}$ meters square,
and where $\omega$=1.88.5 Radians/second (30 Hz),
and where sin $\alpha$=1 (p radians or 90 degrees),
and where $K_{\%}$=10%;

and where the transducer loop dimensions are:

Width=0.635 cm (0.25 in),

Length=243.84 cm (8 feet), and where the vertical component field strength of the earth's magnetosphere at approximately 45 degrees latitude is:

$B$=5.5×10$^{-5}$ webers/meter square, the instantaneous emf is:

$e$=0.000642 volts.

Assuming a linear amplifier string gain of 100 dbmv:

$e$=64.2 volts

Assuming that $K_\%$=10 percent for the event, we would have:

$e$=6.42 volts.

This predicted value reflects those that have been obtained in the field.

Referring to FIG. 6, the vertical components of the earth's magnetic lines of force are shown as 66. The preferred embodiment of this type of transducer is made from a cable containing four non-shielded 18 gauge stranded wires. The Canoga® Brand Model 20002 non-shielded Loop Detector "Lead-In" cable has been found to be suitable.

Figure 7:
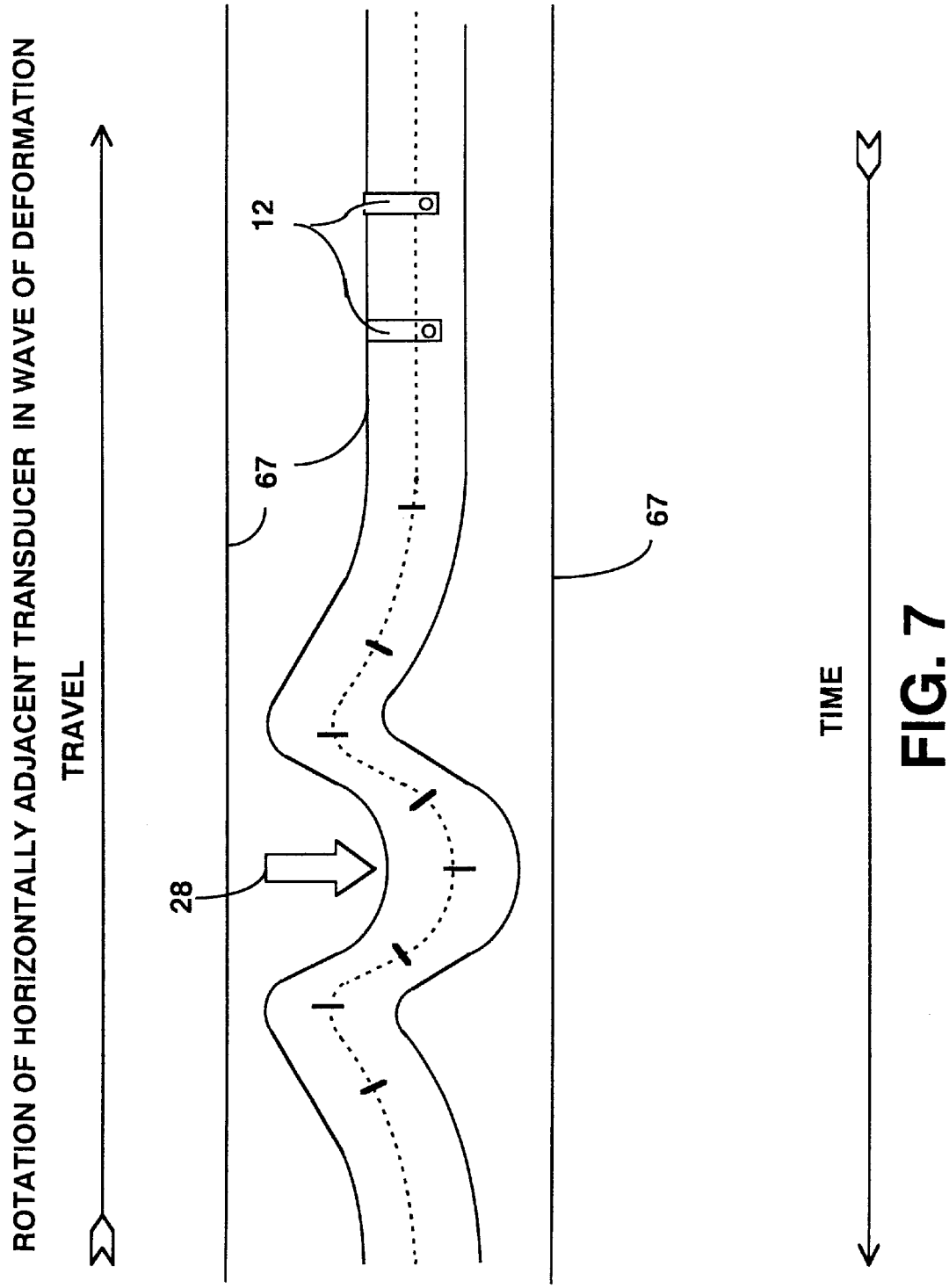
FIG. 7 is a diagrammatic view of a second preferred embodiment of the picostrain engineering data acquisition system illustrating the effect of horizontal magnetic components on the system.

Another transducer configuration for use with the first preferred embodiment of the picostrain detector is an electromagnetic transducer which utilizes a conductive loop as an alternating current generator, utilizing the horizontal component of the earth's magnetosphere as the source of the field. This type of transducer is shown in FIG. 7. This particular type of transducer used with the first preferred embodiment of the picostrain detector may be utilized in dimensionally thin structural sections, as illustrated in FIG. 7, except at or near the earth's magnetic poles, where the horizontal field component is at a minimum, or where the axis of rotational displacement of the transducer is oriented parallel to the horizontal component of the earth's magnetosphere. The horizontal component of the earth's magnetosphere is shown as 67. Since the transducer is inherently uni-axial in sensitivity, it requires no need of any diaphragm or other section to discriminate against unwanted signals generated along the axis of minimum sensitivity.

It would be placed in two or more slots cut into the roadway structure, normal to the roadway surface and parallel to each other. The slots would be approximately ¼ inch wide, and about 6" apart and in normal practice would be positioned at approximately ½ the depth of the structure for interest, for reasons of durability. The primary mechanism of rotation in a horizontal component transducer is due to the instantaneous shear forces present in the structure as a result of the application of a force event. The signal generation mechanism is the same as that described in the article covering the vertical case.

A typical calculation for the transducer as utilized in this particular case would provide the following results:
where N=4 turns,
and where A=0.495 meters square,
and where (=1.88.5 Radians/second (30 Hz),
and where sin a=1 (pi radians or 90 degrees),
and where $K_\%$=10%;
and where the transducer loop dimensions are:

Width=20.32 cm (8 in),

Length=243.84 cm (8 feet), and where the horizontal component field strength of the earth's magnetosphere at approximately 45 degrees latitude is:

$B$=1.7×10$^{-5}$ webers/meter square, the instantaneous emf is:

$e$=0.006345 volts.

Assuming a linear amplifier string gain of 80 dbmv:

$e$=63.5 volts

Assuming that $K_\%$=10 percent for the event, we would have:

$e$=6.35 volts.

This predicted value reflects those that have been obtained in the field.

Linear Amplifier

Class C (Displacement) Transducers

These transducers and their associate electronic systems are well known in the literature. They normally utilize such technologies as:
 accelerometers, normalized to zero gravitational force if utilized to measure horizontal forces, or
 linear displacement transducer technology (LVDT)
for the active component. Some or all of these transducers may be utilized with the invention.

Figure 8:
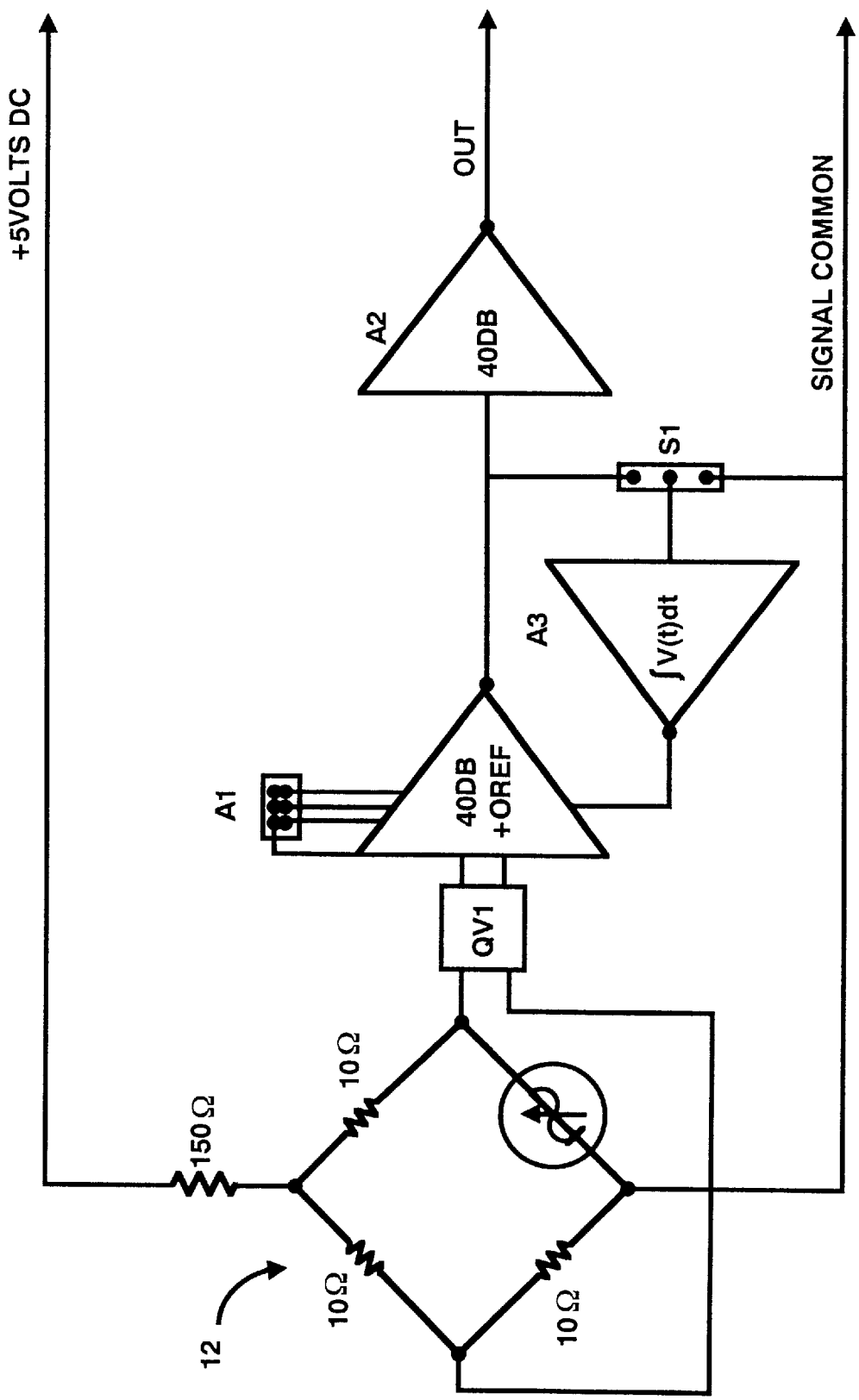
FIG. 8 is a functional block diagram of the picostrain transducer signal detection subsystem.

The functional block diagram of the first preferred embodiment of the picostrain detection subsystem is shown in FIG. 8. In this functional block diagram, the transducer is represented as a variable periodic voltage source attached between two legs of a resistive bridge circuit. The ten ohm variable resistor in the adjacent leg is utilized to balance the quiescent current in the two legs of the bridge. The bridge circuit has been utilized to set the initial operating point into the first amplifier, A1.

The bridge current, of approximately thirty milliamperes (ma.), has been heuristically chosen, as this value approximates that historically utilized in analog inductive loop detection systems. This current excites the transducer with approximately fifteen ma. of current. The choice of this value is low enough to permit the use of the system at locations where site power is provided via photovoltaic arrays in conjunction with batteries. This current through the transducer does develop a torque in the transducer, due to the interaction of the field developed by said current about the transducer and that of the earth's magnetosphere, however, once the system is in stable operation, this torque becomes a system constant.

One watt, five percent devices have been utilized in the bridge circuit to minimize component value drift due to self heating. The use of high precision, one percent devices in the bridge circuit has not been deemed appropriate, as in most applications, a zero tracking circuit, amplifier A3, will be utilized to hold the output of instrumentation amplifier A1 at or near zero during system quiescence.

The over-voltage protection circuit, OV1, consists of one watt, five percent, five volt zener diodes; placed back to back, between the input legs, and between each leg and the signal common rail, to clamp differential and common mode over-voltage threats.

Instrumentation amplifier A1, has programmable gains of 0 db, 20 db, 40 db, and 60 db. 40 db has proven to be sufficient to the needs of the current system embodiments.

Amplifier A3, is a low noise operational amplifier being utilized as a time domain integrator, with a time constant approximating one tenth of a second. This time constant has proven to be too short for use at velocities at or below fifteen feet per second. Increasing this time constant by an order of magnitude would allow data to be accurately taken at this velocity. An increase of two orders of magnitude would allow data to be accurately taken at velocities as low as one and one half feet per second.

Amplifier A2, is a low noise operational amplifier, utilized to provide 40 db of bulk gain to the input of the anti-aliasing filter section. Output of the detection system is to the anti-alias filter subsystem.

Analog Anti-Aliasing Filter

Figure 9:
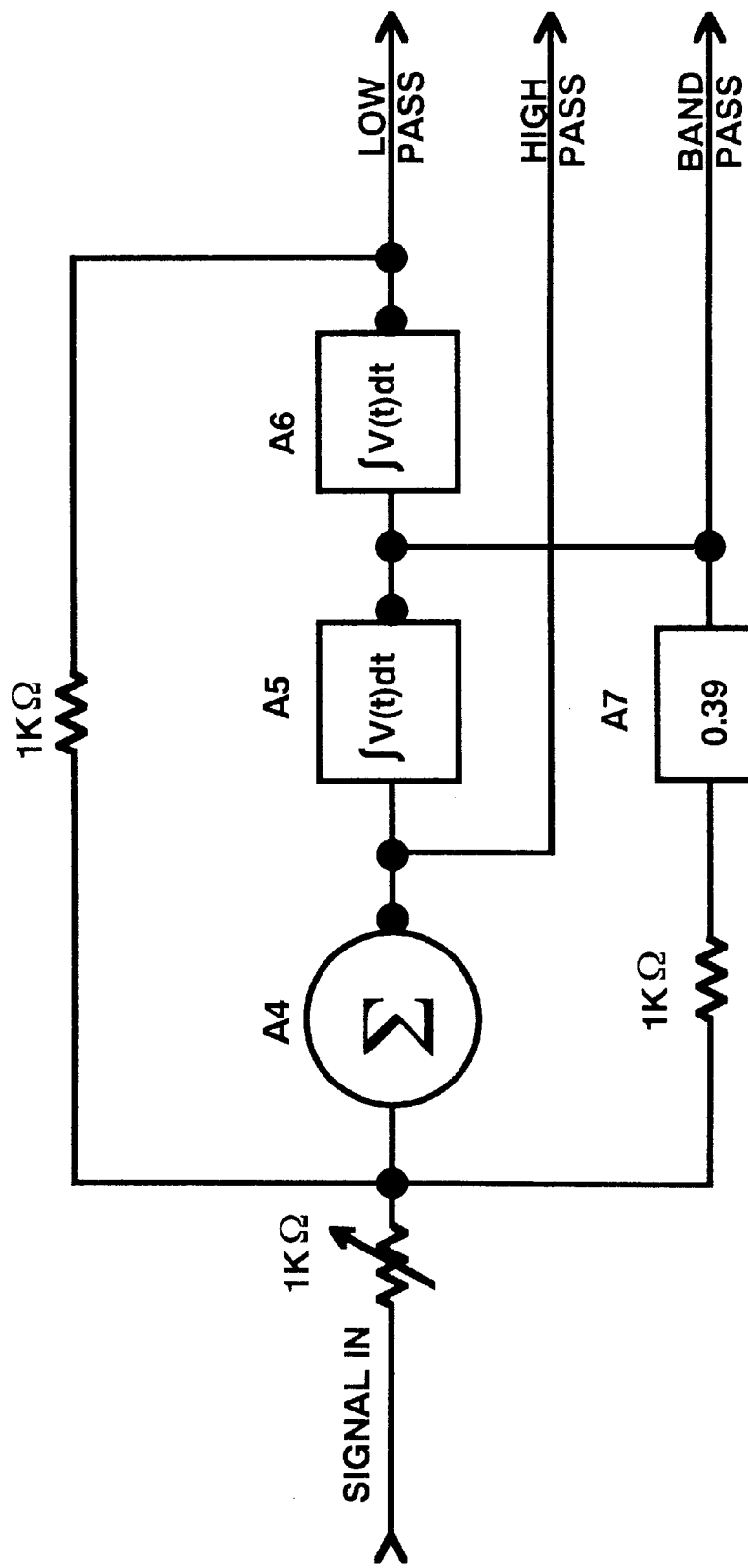
FIG. 9 is a functional block diagram of the filtering subsystem.

FIG. 9 is a functional block diagram which illustrates the main anti-aliasing filter stage for the Picostrain system.

The general characteristics of this filter are well known in the literature, and therefore, only the characteristics as utilized in conjunction with the preferred embodiments of the invention will be discussed.

As utilized in this particular application, it is: an over-damped, second order, variable gain state variable, low pass circuit, providing 20 db of bulk system gain, and 12 db per octave attenuation. The half power knee is at 40 Hz.

This circuit has been chosen because of the inherent design flexibility afforded. Filter gain and filter Q can be independently varied. Low pass, bandpass, and high pass characteristics can be programmed by modifying the Q and gain of the circuit, in conjunction with selection of the desired pass characteristic output.

A 40 HZ half power knee has been chosen for the particular application, due to frequency domain analysis of raw amplified signals during early field investigations. The results of these investigations have shown that most of the event energy of interest of the captured signals, at highway velocities, is in the vicinity of 0.1 to 35 HZ.

The choice of an over-damped filter characteristic has been to assure that signal over/under shoot is predominantly the result of the particular structural application, and not the electronics. Extensive bench testing has been conducted to assure that these undesirable linear amplifier and filter system attributes are at an acceptable minimum.

Although this circuit provides the bulk anti-aliasing function, there are distributed first order low pass filter elements provided at the inputs of all of the main amplifier stages upstream of this function.

Digital Signal Processing (DSP)

Figure 10:
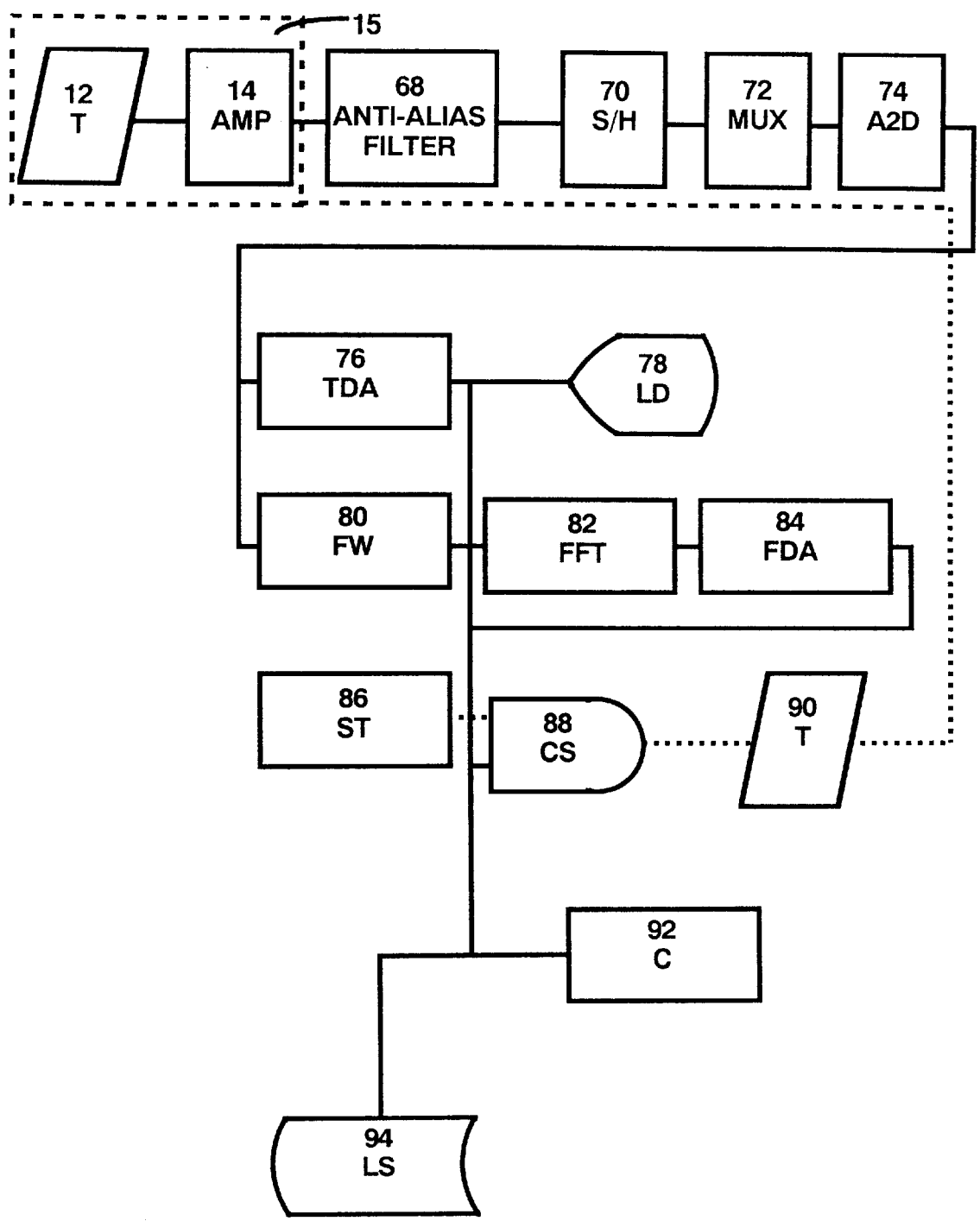
FIG. 10 is a functional block diagram of the on site data collection and pre-processing systems.

The general characteristics of the various subsystems and techniques, utilized for these processes are illustrated in FIG. 10, and are well known in the literature, and will not be developed here. Should a typical example be required, the prior art DSP described in U.S. Pat. No. 5,002,141, is typical of the prior art, and equivalent technologies would be utilized here. The description of prior art digital signal processing hardware of U.S. Pat. No. 5,002,141, is incorporated herein by reference.

FIG. 10 is a functional block diagram of the preferred digital signal processing (DSP) functional components making up the analog and digital data acquisition subsystems of all embodiments of the invention. At 12, one to sixteen transducers 12 are utilized in conjunction with a linear amplifier 14 for each transducer 14 to produce the signal 15 from a force event. Sixty-four (64) or more signals 15 per signal channel can be utilized, however, in the preferred embodiment, 1 to 16 signals 15 per signal channel are utilized. These signals 15 are then sent through the anti-aliasing filter functional component 16. The anti-aliasing filter functional component is typically a set of integrated circuits mounted upon a printed circuit board, which limits the frequency range of the signal and the function of which is well known in the art. The signals from the anti-aliasing filter functional component 16, pass to the sample and hold functional component 70. This functional component captures an instantaneous snapshot of the voltage inputs from each of the signals 15 attached to each of the signal channels at a known time. The input from the transducers is captured by the sample and hold amplifiers as the instantaneous value of the analog signal. The sample and hold amplifiers are typically a set of integrated circuits mounted upon a printed circuit board, and this function is well known in the art. The next functional component is the multiplexer (MUX) 72. The multiplexer 72, periodically poles each signal input channel of the sample and holds functional component 70. The (MUX) is typically a set of integrated circuits mounted upon a printed circuit board, the function of which is well known in the art. The instantaneous signal value from each of the signals held in the sample and hold amplifiers connected to each of the channels poled by the (MUX) 72, are then set to the analog to digital functional component 74, where the instantaneous voltages representing the individual analog signals from each of the signals on each of the channels poled by the (MUX) 72, is quantified into digital numbers representing the instantaneous magnitudes of those signals. The analog to digital functional component 74, is typically a set of integrated circuits mounted upon a printed circuit board, the function of which is well known in the art. The signal passes from the analog to digital functional component 74, to the time domain analysis functional component 76. The time domain analysis functional component 76, typically exists as firmware, with some being hardware and some being software. It correlates signal amplitude with time. The hardware components of the time domain analysis component 76, typically are a set of integrated circuits mounted upon a printed circuit board, the function of which is well known in the art. The software components provide a number of algorithms that, depending upon the needs of the investigator, provide a variety of time domain control and analysis functions; the function of which are well known in the art, and in this particular case, two such functions provided are to: calculate the area encompassed by a power curve derived from the digitized representation of the input signals, and then to calculate the energy envelope for said signals. Additionally, in this particular case, one of the algorithms develops the software triggers to initiate and control data collection functions. This signal may be optionally sent to a local display 78, which can be a cathode ray tube or other on site equipment, the function of which is well known in the art. The frequency window functional component 80 provides a number of algorithms that, depending upon the needs of the investigator, provide a variety of time and frequency domain control and analysis functions; the function of which are well known in the art. In this particular case, it provides time domain conditioning to the signal, such as, but not limited to: defining the duration of the signal observation, and reducing spectral leakage, and providing separation of small amplitude signal components from larger amplitude signal components with frequencies very close to each other, before the signals are passed to the fast fourier transform (FFT) function component 82. The fast fourier transform functional component 82 (FFT) converts the time domain representations of the signals to frequency domain representations of the same signal, the function of which is well known in the art. The frequency domain analysis functional component 84 (FDA) calculates the amplitude vs. the frequency along the X axis. This software component provides a number of algorithms that, depending upon the needs of the investigator, provide a variety of frequency domain control and analysis functions, all of which are well known in the art. The system timing functional component (ST) 86 is the system clock and control function time base, and typically is a set of integrated circuits mounted upon a printed circuit board, the function of which is well known in the art. The system control functional component 88 is typically a set of integrated circuits mounted upon a printed circuit board which contains instructions concerning how all of the (DSP) system functional components interact with each other, the function of which is well known in the art. The triggers functional component (T) 90 is typically a set of integrated circuits mounted upon a printed circuit board which contains instructions concerning when to sample data and when to pull data through the DSP string, the function of which is well known in the art. The communications functional component (C) 92 of the DSP sends data out to another site, such as central offices for further processing, the function of which is well known in the art. The local storage functional component (LS) 94 is a hard drive, magnetic media, optical media, or another type of storage media for storing information about the signals generated, the function of which is well known in the art.

Figure 11:
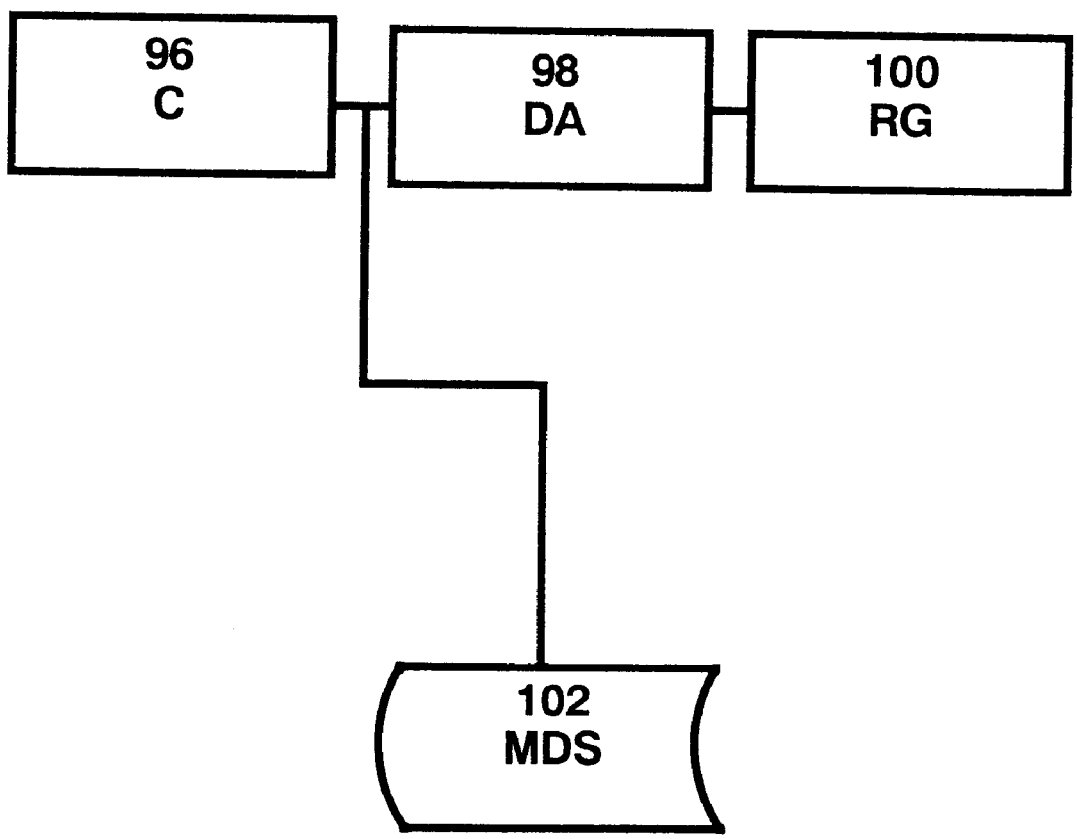
FIG. 11 is a functional block diagram of the main post processing system.

FIG. 11 is a functional block diagram of the main post processing system. This includes the communications functional component (C) 98, the function of which is well known in the art; the data analysis functional component (DA) 98, the function of which is well known in the art; the report generation functional component (RG) 100, the function of which is well known in the art; and main data storage system (MDS) 102, the function of which is well known in the art.

Analysis, Time and Frenquency Domains

The general characteristics of the mathematical methods and techniques, utilized for these processes as illustrated in FIG. 10 and FIG. 11 are well known in the literature, and will not be developed here. Should a typical example be required, the prior art DSP mathematical methods and techniques described in U.S. Pat. No. 5,008,666, is typical of the prior art, and equivalent methodologies and techniques would be utilized here. The description of prior art digital signal processing mathematical methods and techniques of U.S. Pat. No. 5,008,666, is incorporated herein by reference.

While there is shown and described the present preferred embodiments of the invention, it is to be distinctly understood that this invention is not limited thereto but may be variously embodied to practice within the scope of the following claims.

I claim:

1. An engineering data acquisition device for use in an un-referenced orthogonal axis system in space and time, represented by vectors X', Y', Z', and time T', which has a known relationship to a referenced orthogonal axis system defined by the axes X, Y, and Z, time T, and in which a known relationship is developed between said time T' and said time T, comprising:

one or more transducers laid substantially along said Y axis of said referenced orthogonal axis system, which have uni-axial sensitivity to an applied dynamic force applied parallel to said Z axis and normal to said Y axis, and which produce time referenced electric signals in response to forces applied at right angles to a physical displacement of structural material developed within a structural mass;

an amplifier, for amplifying said time referenced electric signals from said one or more transducers;

a filter, for discriminating against unwanted signal components from said time referenced electric signals; and a computer for sensing said time referenced electric signals and for developing a proportional kinetic energy signature for said applied dynamic force;

wherein said one or more transducers are operatively connected to said structural mass, and produce said time referenced electric signals in response to rotation of said structural mass and said one or more transducers through a magnetic field.

2. The device of claim 1 in which said proportional kinetic energy signature for said applied dynamic force is further interpreted by said computer to yield a mass of said applied dynamic force.

3. The device of claim 1 in which said proportional kinetic energy signature for said applied dynamic force is further interpreted by said computer to yield a velocity of said applied dynamic force along a path of travel.

4. The device of claim 1 in which said proportional kinetic energy signature for said applied dynamic force is further interpreted by said computer to identify a force by a kinetic energy signature.

5. The device of claim 4 in which said proportional kinetic energy signature for said applied dynamic force is further interpreted by said computer to yield data relating to acceleration and/or deceleration of a vehicle.

6. The device of claim 1 in which said proportional kinetic energy signature for said applied dynamic force is further interpreted by said computer to yield roadway structural condition data.

7. The device of claim 1 which further includes a sensing unit for sensing a force in a range detectable by said device before or after said applied dynamic force passes over said one or more transducers, said sensing unit produces a signal for controlling said device and for resetting said device for repeat operation.

8. The device of claim 1 in which said one or more transducers further comprise passive conductive coils, which generate a signal by cutting across planetary magnetic lines of force.

9. The device of claim 8 in which said one or more transducers generate a signal by rotational movement generated by differential pressure gradients.

10. The device of claim 8 in which said one or more transducers generate a signal by rotational movement caused by physical displacement waves.

11. The device of claim 8 in which said one or more transducers generate a signal by movement generated by a change in dimension of said one or more transducers.

12. An engineering data acquisition device for use in an un-referenced orthogonal axis system in space and time, represented by vectors X', Y', Z', and time T', which has a known relationship to a referenced orthogonal axis system defined by the axes X, Y, and Z, time T, and in which a known relationship is developed between said time T' and said time T, comprising:

one or more passive transducers which are conductive coils, laid substantially along said Y axis of said referenced orthogonal axis system, which have uni-axial sensitivity to a dynamic force applied parallel to said Z axis and normal to said Y axis, and which produce time referenced electric signals in response to rotational movement caused by said applied dynamic force, wherein said rotational movement is caused by differential pressure gradients or a wave of surface deformation, and wherein said time referenced electric signals are generated by said one or more passive transducers which are conductive coils passing through planetary lines of magnetic force;

an amplifier, for amplifying said time referenced electric signals;

a filter, for discriminating against unwanted signal components from said time referenced electric signals;

a computer for sensing said time referenced electric signals; and computing means to develop a proportional kinetic energy signature for said applied dynamic force, which is unique for any particular vehicle or force event, and which yields any or all of several types of data, including identification, a velocity, acceleration, deceleration, and/or roadway structural integrity for said vehicle or force event.

13. In a system for determining a classification of a force in motion, with an array comprised of two or more transducers which respond to at least one force event set, said at least one force event set comprised of one or more force events, said system having a microprocessor including a storage means, a method comprising the steps of:

installing in said storage means a table containing information about classification of said at least one force event set, including information about force event number and force event spacing;

determining a distance between each of said two or more transducers;

generating a first time referenced signal from a first transducer coil rotating in a magnetic field, said first time referenced signal corresponding to kinetic energy of said at least one force event set;

storing said first time referenced signal in said storage means as a first variable;

generating a second time referenced signal from a second transducer coil rotating in said magnetic field, said second time referenced signal corresponding to kinetic energy of said at least one force event set;

storing said second time referenced signal in said storage means as a second variable;

calculating by said microprocessor a third variable which is the velocity of said at least one force event set between said first transducer coil and said second transducer coil;

calculating by said microprocessor, a fourth variable from said first and second time referenced signals stored within said storage means, a value which corresponds to force event spacing and force event number; and assigning a category to said force event by comparing said fourth variable which corresponds to said force event spacing and said force event number with said table containing information relating force event classification with force event spacing and force event number.

14. The method of claim 13 which further comprises the steps of:

generating said first and second time referenced signals from a plurality of spaced force elements;

sensing said plurality of spaced force elements individually;

generating respective first and second signals for each spaced force element;

generating individual timing values for each of said spaced force elements; and combining said individual timing values.

15. The method of claim 13, which further comprises the steps of:

sensing said force in motion with a force presence sensor;

generating force timing values for said force in motion when said force in motion is sensed;

combining said force timing values while said force in motion is present;

obtaining a force classification from said force timing values; and communicating said force classification to said storage means.

16. In a system for identifying and tracking a force in motion, said system having two or more transducers which respond to a force event and a microprocessor with permanent storage means having a plurality of stored force signatures, a method comprising the steps of:

generating a first signal from said two or more transducers non-tortionally rotating in the Earth's magnetosphere, said first signal corresponding to kinetic energy of said force in motion;

storing said first signal as a first variable in a memory device;

generating a second signal from said two or more transducers non-tortionally rotating in said Earth's magnetosphere, said second signal corresponding to velocity of said force in motion;

storing said second signal in said memory device as a second variable;

using said first and second signals to generate an identifying force signature;

comparing said generated identifying force signature and said plurality of stored force signatures to find a matching force signature; and reading out of said memory device data which corresponds to said matching force signature, if said matching force signature is found.

17. The method of claim 16 which further comprises the steps of:

generating said first and second signals from a plurality of spaced force elements.

18. The method of claim 17, which further comprises the steps of:

establishing a tracking system with multiple sensing nodes;

sensing a presence of said force in motion with two or more force presence sensors located at two geographically separate sites;

generating time referenced force values for said plurality of spaced force elements when said force in motion is sensed;

combining said time referenced force values while said force in motion is present, and comparing said stored force signatures with said identifying force signature to form a recognized force in motion;

communicating location and time data of said recognized force in motion to sensing nodes of said tracking system; and tracking a time referenced passage of said recognized force in motion through geographically separate sites.

19. The method of claim 16, which further comprises the steps of:
  sensing a presence of said force in motion of claim 16 with a force presence sensor;
  generating timing values for said force in motion when said force in motion is sensed;
  combining said timing values while said force in motion is present, associating said force in motion with a time value to form a time referenced force; and
  communicating said identified time referenced force to said permanent storage means.

20. An engineering data acquisition device for acquiring data on applied dynamic force generating objects comprising:
  one or more passive transducers comprised of coils of conductive elements, mounted at or below grade in one or more channels made in a roadway structure and encased in a material with a similar modulus of elasticity as said roadway structure, and oriented generally horizontally along an X-Y plane and at an angle transecting a velocity vector along said roadway structure, in which each of said one or more passive transducers generates an electric signal by moving through planetary lines of magnetic force when physically displaced by an applied dynamic force from passage of said applied dynamic force generating objects over said one or more passive transducers;
  a signal amplifier for amplifying said electric signal and for sending an amplified signal to a means of interpreting said amplified signal; and
  a means of interpreting said amplified signal and converting said amplified signal into engineering data.

21. The data acquisition device of claim 20 in which said means of interpreting said amplified signal and converting said amplified signal into data further comprises:
  a filter, for discriminating against unwanted signal components; and
  a computer with computing means for developing a directly proportional kinetic energy signature for said applied dynamic force from said passage of applied dynamic force generating objects.

22. The data acquisition device of claim 21 in which each of said one or more passive transducers is configured with a first and a second transducer section, with said first transducer section mounted in a same vertical plane as said second transducer section, in a spaced apart relationship.

23. The data acquisition device of claim 21 in which each of said one or more passive transducers is configured generally in a plane with said roadway or other structure, with a first and a second transducer section, with said first transducer section mounted in a same horizontal plane as said second transducer section, in a spaced apart relationship.

24. The data acquisition device of claim 20 in which said one or more passive transducers transects said roadway structure generally normal to a flow of traffic.

25. An engineering data acquisition device for acquiring data from applied dynamic force generating objects acting on a roadway structure, comprising:
  one or more passive transducers comprised of one or more loops of conductive elements, mounted below grade in one or more loops about a force transmitting element, and encased in a material with a similar modulus of elasticity as said roadway structure, and oriented generally horizontally along an X-Y plane, for generating an electric signal;
  a signal amplifier for amplifying said electric signal and for sending an amplified electric signal to a means of interpreting said amplified signal;
  converting said amplified electric signal into engineering data through use of said means of interpreting said amplified electric signal;
  a filter, for discriminating against unwanted signals; and
  a computer with computing means for developing a directly proportional kinetic energy signature for an applied dynamic force from said applied dynamic force generating objects;
  wherein each of the one or more passive transducers generates a signal by a change of dimension and resultant differential movement through planetary lines of magnetic force when an applied dynamic force from a passing applied dynamic force generating object causes an expansion of said roadway structure beneath said force transmitting element.

26. A data acquisition method, comprising the steps of:
  making a channel into a roadway structure generally normal to a direction of vehicular traffic on said roadway structure, for placement of electrically conductive loops;
  placing one or more passive transducers comprised of electrically conductive loops in said channel in said roadway structure, from which position said electrically conductive loops will cut across lines of magnetic force when said electrically conductive loops encounter an applied dynamic force from a moving force generating object and generate a signal;
  filling said channel which contains said electrically conductive loops with a material having the same approximate modulus of elasticity as said roadway structure;
  connecting each of said electrically conductive loops to an amplifier, for amplifying said signal to create an amplified signal;
  sending said amplified signal to a means of interpreting said amplified signal; and
  using said amplified signal to generate data from said applied dynamic force from said moving force generating object.

27. The data acquisition method of claim 26 further comprising the steps of:
  sending said amplified signal to a filter;
  filtering said amplified signal through said filter, to discriminate against unwanted signals; and produce a filtered amplified signal;
  sending said filtered amplified signal to a computer with computing means for developing a directly proportional kinetic energy signal for said applied dynamic force from said moving force generating object.

28. The data acquisition method of claim 26 which further includes the step of installing a first and a second transducer section in said channel with said first transducer section mounted in a vertical plane and said second transducer section mounted in the same vertical plane as said first transducer section, said first transducer section and said second transducer section positioned in a parallel and spaced apart relationship.

29. The data acquisition method of claim 26 which further comprises a step of making at least two channels, and installing a first transducer in one channel, and a second transducer in a second channel, with said first transducer mounted in a same horizontal plane as said second transducer, in a spaced apart relationship.

30. The data acquisition method of claim 26 which further comprises generating a force signature which is unique to said applied dynamic force from said moving force generating object.

31. The data acquisition method of claim 26 which further includes a step of generating data which includes a mass specific to said moving force generating object.

32. The data acquisition method of claim 26 which further includes a step of generating data which includes acceleration and/or deceleration data for said moving force generating object.

33. The data acquisition method of claim 26 which further includes a step of generating data which includes data on velocity of said moving force generating object.

34. The data acquisition method of claim 26 which further includes a step of generating data which includes data on tracking said moving force generating object at geographically separate sites.

35. An engineering data acquisition device for use in an un-referenced orthogonal axis system in space and time, represented by vectors X', Y', Z', and time T', which has a known relationship to a referenced orthogonal axis system defined by the axes X, Y, and Z, time T, and in which a known relationship is developed between said time T' and said time T, comprising:

one or more transducers laid substantially along said Y axis of said referenced orthogonal axis system, which have uni-axial sensitivity to an applied dynamic force applied parallel to said Z axis and normal to said Y axis, and which produce time referenced electric signals in response to said applied dynamic force when applied at right angles to a physical displacement of structural material developed within a structural mass;

an amplifier, for amplifying said time referenced electric signals from said one or more transducers;

a filter, for discriminating against unwanted signal components from said time referenced electrical signals; and a computer for sensing said time referenced electric signals and for developing a proportional kinetic energy signature for said applied dynamic force, for identifying said applied dynamic force, and for yielding a mass and a velocity of travel along a path of travel of said applied dynamic force, and to identify said applied dynamic force by a unique kinetic energy signature, acceleration and/or deceleration data, and roadway structural condition data.

* * * * *